(12) United States Patent
Sun

(10) Patent No.: US 12,301,639 B2
(45) Date of Patent: May 13, 2025

(54) METHOD FOR SHARING ELECTRONIC CONTENT OR COMMENTS TO SPECIFIC USERS

(71) Applicant: JIANGSU YANCHENG SCENERY AND WIND NETWORK TECHNOLOGY RESEARCH INSTITUTE, Yancheng (CN)

(72) Inventor: Jian Sun, Yancheng (CN)

(73) Assignee: Jian Sun, Jiangsu (CN)

( * ) Notice: Subject to any disclaimer, the term of this patent is extended or adjusted under 35 U.S.C. 154(b) by 112 days.

(21) Appl. No.: 17/478,957

(22) Filed: Sep. 19, 2021

(65) Prior Publication Data

US 2023/0089889 A1 Mar. 23, 2023

(51) Int. Cl.
| | |
|---|---|
| *H04L 65/40* | (2022.01) |
| *G06F 3/0482* | (2013.01) |
| *G06F 3/04845* | (2022.01) |
| *G06F 16/23* | (2019.01) |
| *H04L 65/1069* | (2022.01) |
| *H04L 65/401* | (2022.01) |
| *G06F 3/0483* | (2013.01) |

(52) U.S. Cl.
CPC ........ *H04L 65/4015* (2013.01); *G06F 3/0482* (2013.01); *G06F 3/04845* (2013.01); *G06F 16/2379* (2019.01); *H04L 65/1069* (2013.01); *G06F 3/0483* (2013.01)

(58) Field of Classification Search
CPC ............. H04L 65/4015; H04L 65/1069; G06F 16/2379; G06F 3/0482; G06F 3/04845; G06F 3/0483
See application file for complete search history.

(56) References Cited

U.S. PATENT DOCUMENTS

| | | | | |
|---|---|---|---|---|
| 9,208,153 | B1* | 12/2015 | Zaveri | G06F 16/335 |
| 11,048,387 | B1* | 6/2021 | Srinivasan | G06Q 10/10 |
| 2002/0120635 | A1* | 8/2002 | Joao | G09B 5/02 |
| 2007/0061425 | A1* | 3/2007 | Yamamoto | G06Q 10/10 |
| | | | | 709/219 |
| 2012/0311131 | A1* | 12/2012 | Arrasvuori | G06F 21/6245 |
| | | | | 709/224 |
| 2012/0331568 | A1* | 12/2012 | Weinstein | H04L 12/185 |
| | | | | 726/29 |
| 2014/0108527 | A1* | 4/2014 | Aravanis | G06Q 50/01 |
| | | | | 709/204 |

(Continued)

*Primary Examiner* — David E Choi

(57) ABSTRACT

The present disclosure provides a method for sharing electronic content or comments to specific users, and applied corresponding clients and servers. The method applied to clients includes: receiving a sharing operation instruction of a first user for electronic content or comments at a client of the first user; forming sharing initiating data; sending the data to a server; receiving sharing receiving data related to the sharing operation sent by the server at clients of specific users; and displaying the sharing information in a prominent manner. The method applied to servers includes: receiving sharing initiating data sent by the client of the first user; forming sharing receiving data; and sending the sharing receiving data to the clients of the specific users. By adopting the method of the present disclosure, the sharing to the specific users is more direct and efficient.

20 Claims, 23 Drawing Sheets

(56) References Cited

U.S. PATENT DOCUMENTS

| | | | |
|---|---|---|---|
| 2015/0046834 A1* | 2/2015 | Wu | H04L 51/04 |
| | | | 715/748 |
| 2016/0119295 A1* | 4/2016 | Kohli | H04L 63/08 |
| | | | 713/168 |
| 2016/0239488 A1* | 8/2016 | Aguilon | G06F 16/93 |
| 2017/0095735 A1* | 4/2017 | Kondo | A63F 13/803 |
| 2020/0090126 A1* | 3/2020 | Chung | G06F 40/169 |
| 2020/0213326 A1* | 7/2020 | Herman | H04L 51/10 |
| 2021/0004131 A1* | 1/2021 | Varshney | G11B 27/005 |
| 2021/0141938 A1* | 5/2021 | Carter | G06F 21/6263 |
| 2021/0264018 A1* | 8/2021 | Helles | G06F 21/45 |
| 2022/0368666 A1* | 11/2022 | Liao | H04L 51/42 |
| 2023/0007065 A1* | 1/2023 | Chang | H04L 65/1089 |
| 2023/0052325 A1* | 2/2023 | Katoch | G06F 21/602 |
| 2023/0089889 A1* | 3/2023 | Sun | G06F 3/04845 |
| | | | 715/753 |

\* cited by examiner

| | |
|---|---|
| 1101 | < Liked by |
| | Shared by Buddies: |
| | User1 |
| 1102 | Others: |
| | User201 |
| | User202 |
| | User203 |
| | User204 |
| | User205 |
| | User206 |
| | User207 |
| | User208 |
| | User209 |
| | User210 |
| | User211 |
| | User212 |
| | User213 |
| | User214 |

METHOD FOR SHARING ELECTRONIC CONTENT OR COMMENTS TO SPECIFIC USERS

TECHNICAL FIELD

The present disclosure relates to the field of computers, and more particularly to a method for sharing electronic content or comments to specific users.

BACKGROUND

Currently, people browse various kinds of information on the network. Electronic content is content stored or propagated in the form of data, including words, pictures, audio, videos, etc. on the network and combinations thereof, which may be news, introductions of commodities, or articles in a specialized domain.

The application software of the electronic content is used to display the electronic content, and it can be a special client program, for example, Yahoo News, Headlines and Tiktok, or a general browser in which a network platform such as a Yahoo website is logged in. Hereinafter, the application software of the electronic content is abbreviated as electronic content APP.

In the prior art, registered users (hereinafter users for short) may share electronic content to friend users through third-party software, wherein if one user submits a friend application to another user, and after the other user consents, the two users are friend users, which are called friends for short. The manner of specific sharing is generally as follows. In the electronic content APP, the link of the electronic content is sent to the friends, such as friends in the instant messaging software, in the third-party software through the sharing button. After the friends receive the message in the third-party software, they click the shared link, and then return to the original electronic content APP. If the friends are users of the electronic content APP, the process is not direct enough, and there are the following main problems:

Firstly, friend sharing cannot be implemented inside the electronic content APP. Hence, because the sharing relies on the third-party software, the sharing process is long. The link is sent from the electronic content APP to the third-party software, and in the third-party software, such as the instant messaging software, the link is clicked back to the original electronic content APP.

Secondly, more importantly, when a user of the electronic content APP reads a certain electronic content, even if friends in real life already given a like to or comment the same electronic content in the same electronic content APP, the names of the friends in the electronic content APP are not known; or even though they are known, in the electronic content APP, the names of the users who have given a like are not directly displayed, or the users who comment are so many that the comments of the friends are not shown, which results in that the users cannot perceive the liking and commenting operations of the friends.

Existing sharing modes also have other problems. For example, because the comments have no separate links, the comments cannot be shared individually to the friends. In many cases, the users prefer to share the wonderful comments of the electronic content with their friends. The manners of existing sharing cannot satisfy the requirements of the users.

SUMMARY

In order to solve the above problems and make the sharing of friends more convenient and direct, the present disclosure discloses a method for sharing electronic content or comments to specific users.

A method for sharing electronic content or comments to specific users is provided, applied to a client, including the following steps:
 receiving a sharing operation instruction of a first user for electronic content or comments at a client of the first user;
 forming a sharing initiating data related to the sharing operation at the client of the first user;
 sending the sharing initiating data to a server at the client of the first user;
 receiving a sharing reception data related to the sharing operation sent by the server at clients of specific users; and
 displaying the sharing information of the first user in a prominent manner in a display page or window for the electronic content at the clients of the specific users;
 wherein the specific users are receiving users determined in the sharing operation of the first user in the electronic content or the comments, receiving users determined by the first user in advance, or receiving users determined by a system.

A computing device is provided, including a processor and a readable storage medium storing a computer program. The computer program is able to implement the above method applied to the client when loaded and executed by the processor. The processor for loading and executing is a processor of the computing device or a processor of other computing devices. The other computing device downloads the computer program from the computing device through a network.

A method for sharing electronic content or comments to specific users is provided, applied to a server, including the following steps:
 receiving a sharing initiating data of electronic content or comments thereof sent by the client of the first user;
 forming a sharing receiving data according to the sharing initiating data; and
 sending the sharing receiving data to clients of specific users;
 wherein the sharing information is displayed in a prominent manner after the clients of the specific users receive the sharing receiving data; and the specific users are receiving users included in the sharing initiating data, receiving users determined by the first user in advance, or receiving users determined by the system.

A computing device is provided, including a processor and a readable storage medium storing a computer program. The computer program is able to implement the above method applied to the sever when loaded and executed by the processor.

A sharing system for electronic content or comments is provided. The sharing system includes the client computing device and the server computing device which are communicated with each other to complete the respective method above.

By adopting the above devices and methods, the sharing to specific users is more direct and efficient.

BRIEF DESCRIPTION OF THE DRAWINGS

FIG. 11 is a display interface diagram of a user who gives a like according to an embodiment of the present disclosure;

DETAILED DESCRIPTION OF EMBODIMENTS

In order to make the purpose, technical solution and advantages of the present disclosure clearer, the present disclosure will be further described in detail in combination with the drawings and the embodiments. It should be understood that the specific embodiments described herein are only used to explain the present disclosure and are not used to limit the present disclosure.

Figure 1:
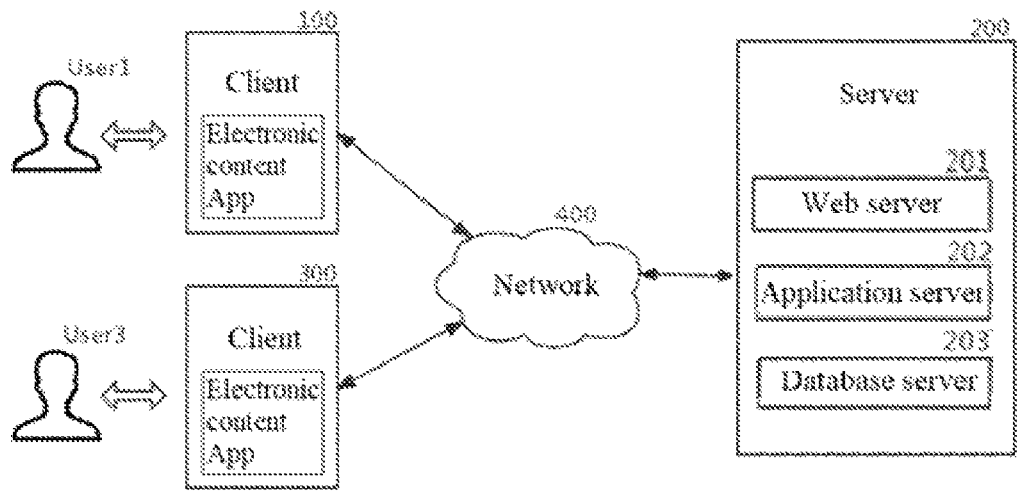
FIG. 1 is a system diagram of communication between a client and a server according to an embodiment of the present disclosure.

As shown in FIG. 1, it is a platform system by which the electronic content APP with specific sharing is communicated with the server. A client 100 and a client 300 are terminal devices such as a mobile phone, a tablet computer, a PDA, and a desktop computer. Furthermore, an electronic content APP of the present disclosure is installed on the clients. In FIG. 1, the user logs in to the electronic content APP on the client 100 with the name of User1, and another user logs in to the electronic content APP on the client 300 with the name of User3. Of course, other users may log in the same electronic content APP on own clients.

All the clients are communicated with a server 200 in a certain protocol through a network 400. The network 400 can be a local area network, an Internet, or the like. The protocol can be an HTTP protocol, and in other embodiments, a common protocol such as TCP/IP or a specially customized protocol can be adopted. The user can send a request, such as a user login request, an electronic content browsing request, a sharing request, etc., to the server 200 through the electronic content APP installed on the client.

The server 200 can receive the request sent by the clients, process the request, and send the result to the relevant clients. For example, the interior of the server 200 in FIG. 1 displays the internal composition of the server in one embodiment. First, a Web server program 201 receives the client request, and delegates the request to an application server program 202. The application server program 202 can process the request by using dynamic web page technologies such as CGI, PHP, JSP, and ASP. In this process, the database server program 203 may also be invoked to access a database, such as a user database, an electronic content database, a database related to sharing, etc. Finally, the Web server program 201 also sends the completed dynamic web page to the relevant clients.

The server 200 may be not only one server computer, but also may be composed of a plurality of server computers. For example, the function of the Web server program 201 may be implemented individually by one or by more server computers; the function of the application server program 202 may also be implemented individually by one or by more server computers; alternatively, a plurality of database server computers constitute a distributed database system to complete the function of the database server program.

In another embodiment, the communication between the client and the server 200 adopts a non-HTTP protocol; therefore, the Web server 201 is replaced by other servers adapted to the protocol, and functions of receiving a client request and sending a result to the client are completed. Further, these jobs are completed directly by the application server 202.

Figure 2:
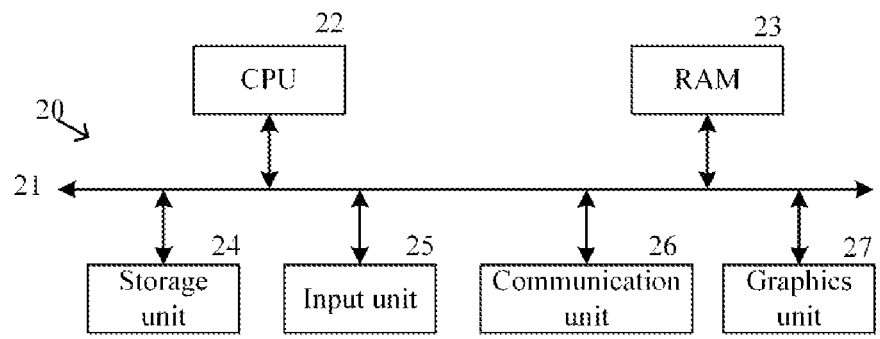
FIG. 2 is a structural diagram of a hardware system according to an embodiment of the present disclosure.

Whether a client device or a server computer belongs to a computing device, and a hardware architecture as shown in FIG. 2 can be adopted. It should be noted that the hardware configuration is merely an example, and a computer system including hardware different from the hardware shown may be employed. For example, unnecessary units may be removed; some server computers may not need input units or display units; and additional units may also be added to the server computers.

The computer system 20 includes a CPU 22, a RAM 23, a storage unit 24, an input unit 25, a communication unit 26, and a graphics unit 27, which are connected via a communication bus 21.

The CPU 22 comprehensively controls the processing performed by the computer system 20. The RAM 23 is a volatile memory. The storage unit 24 is non-volatile, and includes a readable storage medium such as a magnetic hard disk, a solid-state disk, an optical disk, and a flash disk. In another embodiment, a non-volatile memory ROM is further included. Generally, an electronic content APP or a server program may be stored in the storage unit 24 in advance, and after being loaded into the RAM 23, the CPU executes the program instructions to complete respective corresponding functions.

In addition, the computer system 20 may further include an input unit 25, including a keyboard, a mouse, a touch panel, and the like. On the client, the user sends a command for loading and executing the electronic content APP to the computer system 20 through the operation on the input unit, or sends a specific sharing command on the interface of the electronic content APP.

The communication unit 26 includes, for example, a network adapter including the RJ45 module, and can connect the computer system of the client and the server to the network 400 shown in FIG. 1, so that the communication can be performed between the two. The communication unit of the client may further include a wireless communication WIFI module, a 2G-5G mobile communication module, and the like. In another embodiment, the client can also be connected to a download server through the network 400, and the electronic content APP of the present disclosure can be downloaded from the storage unit, that is, the readable storage medium, of the download server to the client for installation and execution. The download server may also have the hardware architecture shown in FIG. 2.

The display unit 26 includes a graphic controller and a display device connected to the graphic controller, such as an LCD, an LED display, a CRT display, a touch screen, or the like. On the client, specific sharing content of other users can be displayed.

On the client, operating systems, such as Windows, Android and iOS, may be used. The server may use an operating system such as Linux, Unix, Windows Server, and the like.

Hereafter the present disclosure will be further described in combination with the drawings and specific embodiments.

Figure 4:
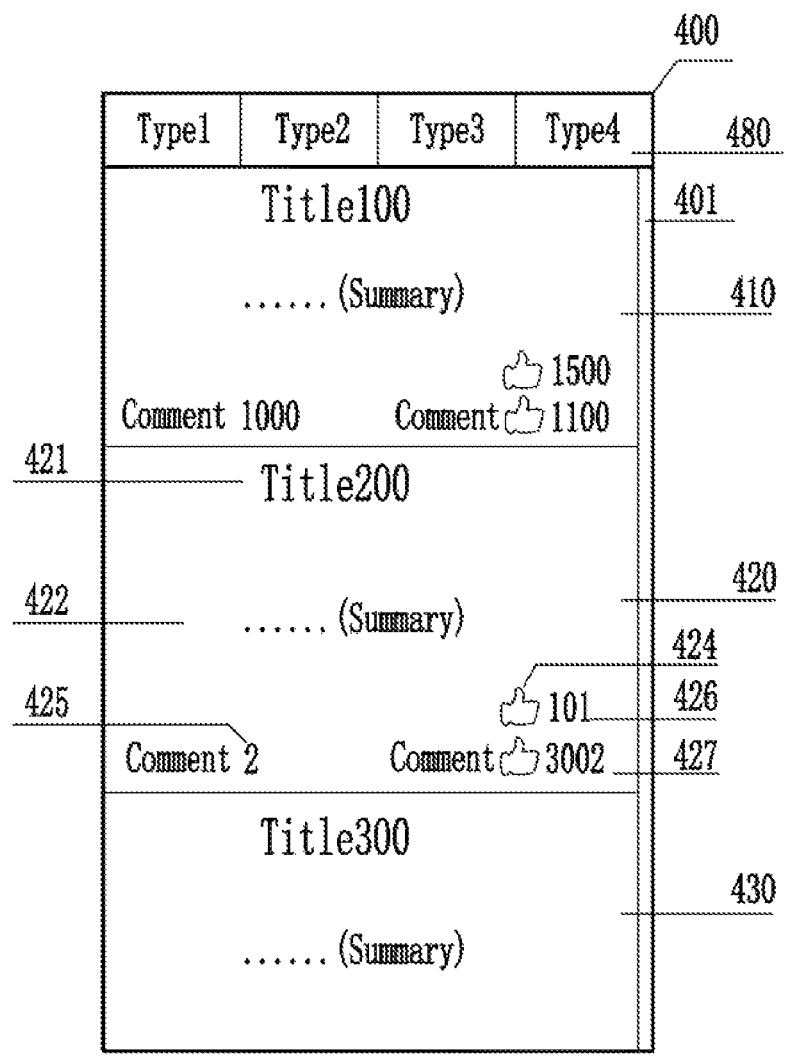
FIG. 4 is a list display interface diagram of a common electronic content according to an embodiment of the present disclosure.
Figure 5:
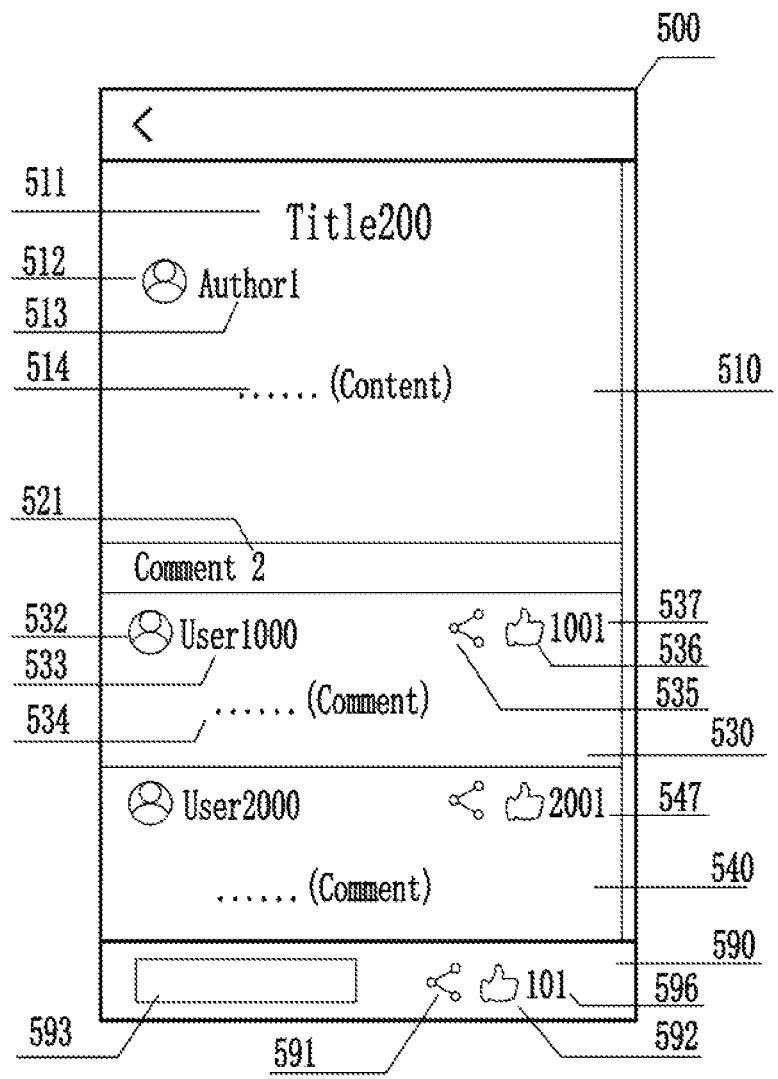
FIG. 5 is a full-text display interface diagram of a common electronic content according to an embodiment of the present disclosure.

It is assumed that a user with the name of User1 logs in to the application on a terminal device, and the interface shown in FIG. 4 and FIG. 5 is displayed.

The interface 400 shown in FIG. 4 is an electronic content list display interface, and is composed of a fixed label bar 480 and a slidable electronic content list below. Each of the labels "Type1" to "Type4" on the label bar 480 corresponds to one type of electronic content. The labels may be "focus news", "finalize", "video", etc. After a label is clicked, the electronic content under the corresponding type of the label is displayed. The rightmost area 401 is a sliding bar area, and in the program interface herein, the corresponding areas on the left side, such as 410, 420 and 430, may be slid upward and downward as a whole. The area 401 may be hidden from display in an actual interface.

In the electronic content list in FIG. 4, each of the areas 410, 420, and 430 separated by horizontal lines corresponds to one electronic content. Each area includes a title and a summary of the electronic content, and may also include an author name, pictures or videos related to the content, and the like. For example, for the area 420, the title is "Title 200" shown in 421, and the summary is shown in 422. 425 and 426 indicate the total number of comments and the total number of likes of the electronic content by users, respec-
tively. The number in 427 immediately follows the combination of the "Comment" and symbols of likes, indicating the total number of likes to all comments of the electronic content by users.

424 is a symbol of a like, which expresses the liking or approval of users to the electronic content or comments. In another embodiment, the symbol of the downward thumb is added, indicating the meaning of disgust or disapproval. Whether like or disapproval, an attitude of the user is expressed, so this symbol is called an attitude symbol.

The summary 422 in 420 is clicked, and a display interface 500 of the full text of the electronic content of FIG. 5 may be generated. The area 510 displays the electronic content itself, 511 is the title, 512 and 513 are the author image and the name respectively, and 514 is the specific content. The values of 521 and 425 are the same, and both represent the total number of the comments of the electronic content.

In the fixed area 590, 591 is the sharing symbol of the electronic content. 592 and 596 thereafter are the symbol of the like and the total number of the likes to the electronic content respectively, and 593 is a comment input box of the electronic content.

The areas 530, 540 below the electronic content display area 510 display only two comments of the electronic content. In the comment area 530, 532 and 533 are the avatar and name of a commenter respectively, 534 is the content of the comment, 535 is the sharing symbol of the comment, and 536 and 537 are the symbol of the like and the total number of the comments respectively. The sum of the total number of the comments and the likes, that is, the sum of "1001" in 537 and "2001" in 547, is 3002, which is equal to the number in 427 in FIG. 4.

On the interfaces of FIG. 4 and FIG. 5, in the prior art, the user may give a like or comment on the electronic content, and give a like or comment on the comments, etc. Since the result can be seen by all users, it also belongs to a sharing, which is called a common sharing.

Compared with the common sharing, this embodiment can realize specific sharing. It is characterized in that the specific receiving user of the sharing, also referred to as a specific user, is determined by the initiating user or system, and the specific sharing is displayed in a prominent manner on the client of the receiving user. Thus, the receiving user can easily find that the electronic content or comments read by the receiving user is a sharing performed by other users such as friends. Thus, the common sharing has a certain directivity. For example, a friend user is determined as a specific receiving user, and the sharing is referred to as friend sharing belonging to a specific sharing. In this embodiment, the user initiating the specific sharing is the User1 and the receiving user as a friend is the User3.

The objects of the common sharing and the specific sharing are the electronic content itself or comments thereof. The specific sharing initiated at the client by the user includes the following three ways.

The first is direct sharing. The sharing object may be the electronic content. For example, the user User1 clicks the sharing symbol 591 in FIG. 5 to share the electronic content in the area 510. The sharing object also may be the comments themselves. For example, the share symbol 535 is clicked and the receiving user selection interface will appear, as shown in 600 in FIG. 6. After one or more friends, such as the User3, are selected and the "OK" button of 692 is pressed, the corresponding electronic content or comment can be directly shared to the selected friends User3. All the direct sharing belongs to the specific sharing.

The second is sharing through attitude. For example, when the user User1 clicks the attitude symbol 592 or 536 in FIG. 5, the corresponding sharing objects are the electronic content 514 and the comment 534, respectively. A time threshold value between 0.1-3 seconds, such as, 1 second, can be determined firstly; and when the duration time of pressing the attitude symbol is less than the time threshold value, it is a common like, and only belongs to a common sharing. When the duration time of pressing the symbol of attitude is more than the time threshold value, it represents a common like, and the friend selection interface is popped up, as shown in 600 in FIG. 6. After the user selects the friends to share, the user presses the "OK" button 692, so that the user can share the attitude presented by like with the selected specific user, such as the friend User3.

The sharing may also be performed through the comment, that is, a specific sharing may be set when the comments are input. For example, the user User1 clicks the comment input box 593 in FIG. 5, or clicks the comment 534, and the comment interface 700 shown in FIG. 7 appears. The area 710 displays the contents of the objects shared by the comments, which are electronic content 514 or comments 534, respectively. 721 is a specific comment input box. 722 is a selection box, and 723 is a word "To Buddies", and the two together constitute an option for sharing to a specific user or not. If 722 is not selected, the sharing is a common comment sharing. If 722 is selected, it means that a specific sharing is also given to a specific user. If a specific username list is desired, the text "To Buddies" of 723 may be clicked to pop up a friend selection interface as shown in 600 in FIG. 6. After the interface is popped up, the default receiving user is displayed first, such as, the last selected friends or all friends. The user User1 may also select other receiving users, such as the User3, on this interface. After the selection is completed, the "OK" button of 692 is pressed to return to the interface of FIG. 7, and the "Submit" button of 725 is clicked. In the present disclosure, the electronic content APP publishes the comments of the user User1, and sends an instruction for sharing the comments to the selected friend User3. The new comments are finally displayed in areas such as 950 and 930 in FIG. 10. In the above step, as long as 722 is selected, the client can receive the specific sharing receiving user as the default receiving user that is displayed first after the selection interface is popped up, even if the 723 is not clicked and the selection interface is popped up.

From the above operations, it can be seen that, the sharing through comment is that the original electronic content or the original comments are used as a comment object, and a new comment is published. Hence, in a practical sense, the original electronic content or comments are shared, and the new comment is shared. Hence, in the embodiment of the present disclosure, when sharing through comment is considered, the new comment is directly shared. The comment object may be determined in the following manners: if the new comment has no previous-level comment, the electronic content to which the new comment belongs is the comment object thereof; if the new comment has a previous-level comment, the previous-level comment is a comment object of the new comment, and the new comment is a following comment of the previous-level comment. For example, in the comment 934 in the area 930 in FIG. 10, the content after "\\" is "User1000: . . . ", which represents the author and the content of the comment 534 separated by the colon, and the comment 934 is the following comment of the comment 534. In the comment 952 in the area 950 in the figure, there is no "\\", indicating that the comment object is the electronic content itself.

Figure 6:
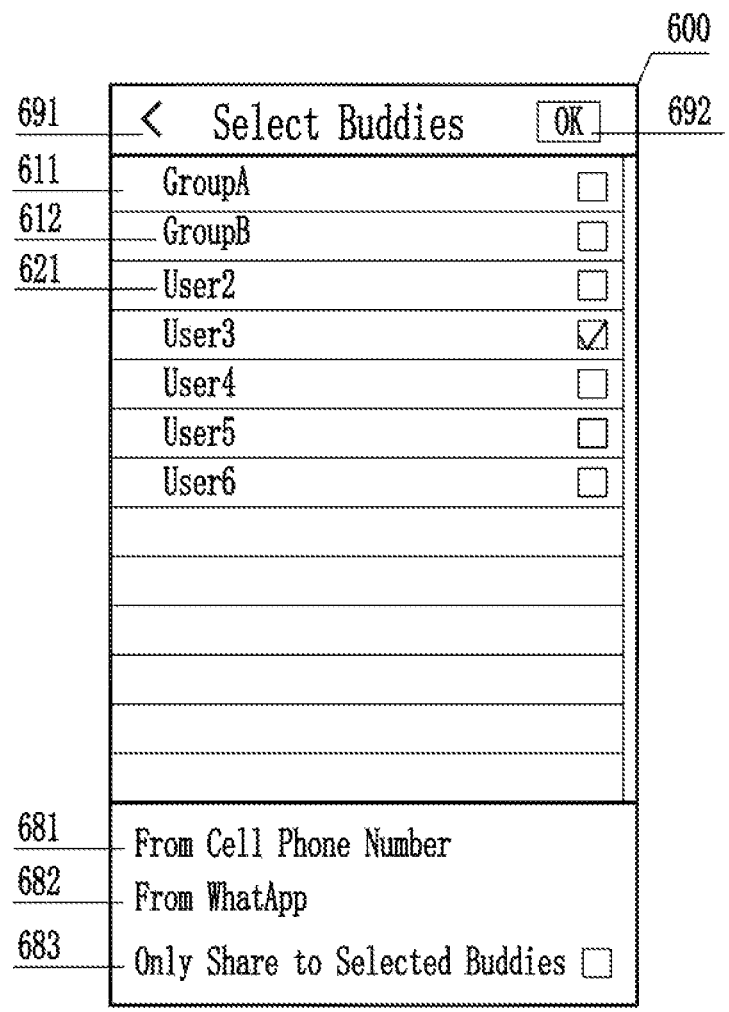
FIG. 6 is a selection interface diagram of a specific user according to an embodiment of the present disclosure.

In the above sharing, 600 in FIG. 6 is a selection interface for specific users such as friends. The left symbol 691 indicates an abandonment selection and returning to the previous interface. The "OK" button of 692 indicates that the friend selection is confirmed, and the next step is continued. The list 611 and the list 612 in the figure represent user groups named "Group A" and "Group B", respectively. 621 and the following are friend names. One or more friends may be selected, or a user group may be selected, that is, all the users in the user group are selected. However, it should be noted that the users in the user group are not necessarily all friends, so there are situations where a receiving user of the specific sharing is not a friend.

When the user User1 initiates each specific sharing operation, the user User1 determines the receiving users of the sharing. In other embodiments, the receiving users cannot be specified at the time of sharing, but are preset by the user. For example, the user may determine one or more friends in advance as the receiving users for each specific sharing later. Of course, the user User1 may also modify the preset receiving users. The receiving users may also be set by the system, for example, all friends or followers described later are the receiving users.

Figure 8:
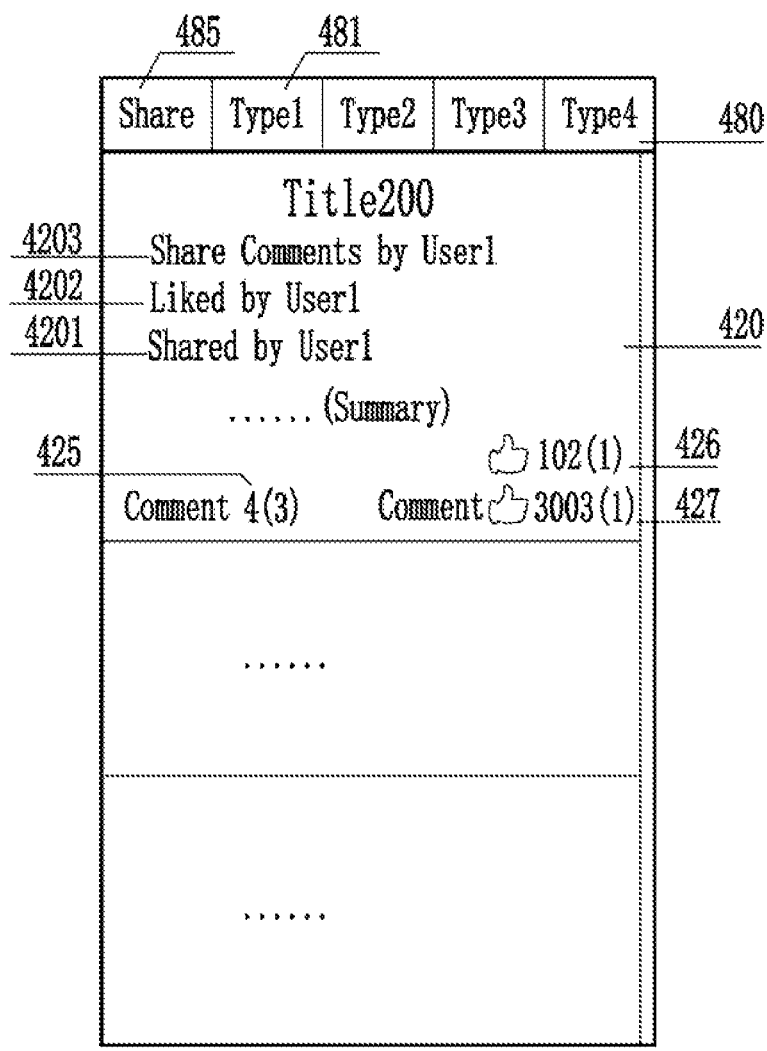
FIG. 8 is a list display interface diagram of electronic content with specific sharing information according to an embodiment of the present disclosure.
Figure 9:
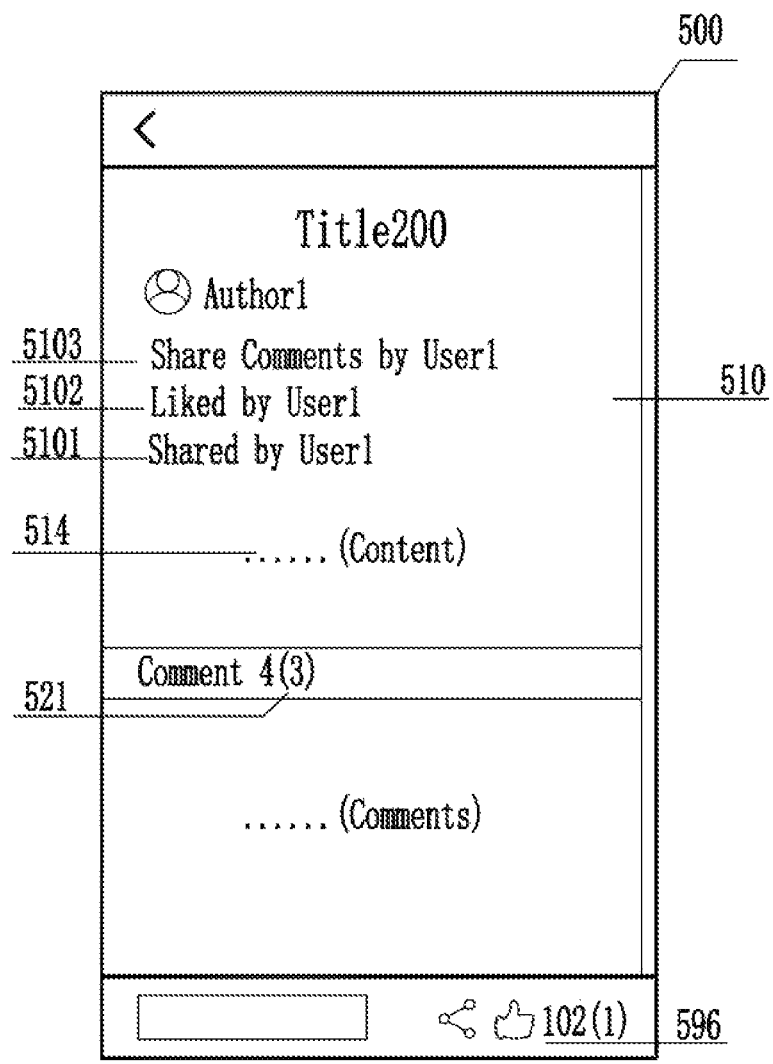
FIG. 9 is a full-text display interface diagram of electronic content with specific sharing information according to an embodiment of the present disclosure.
Figure 10:
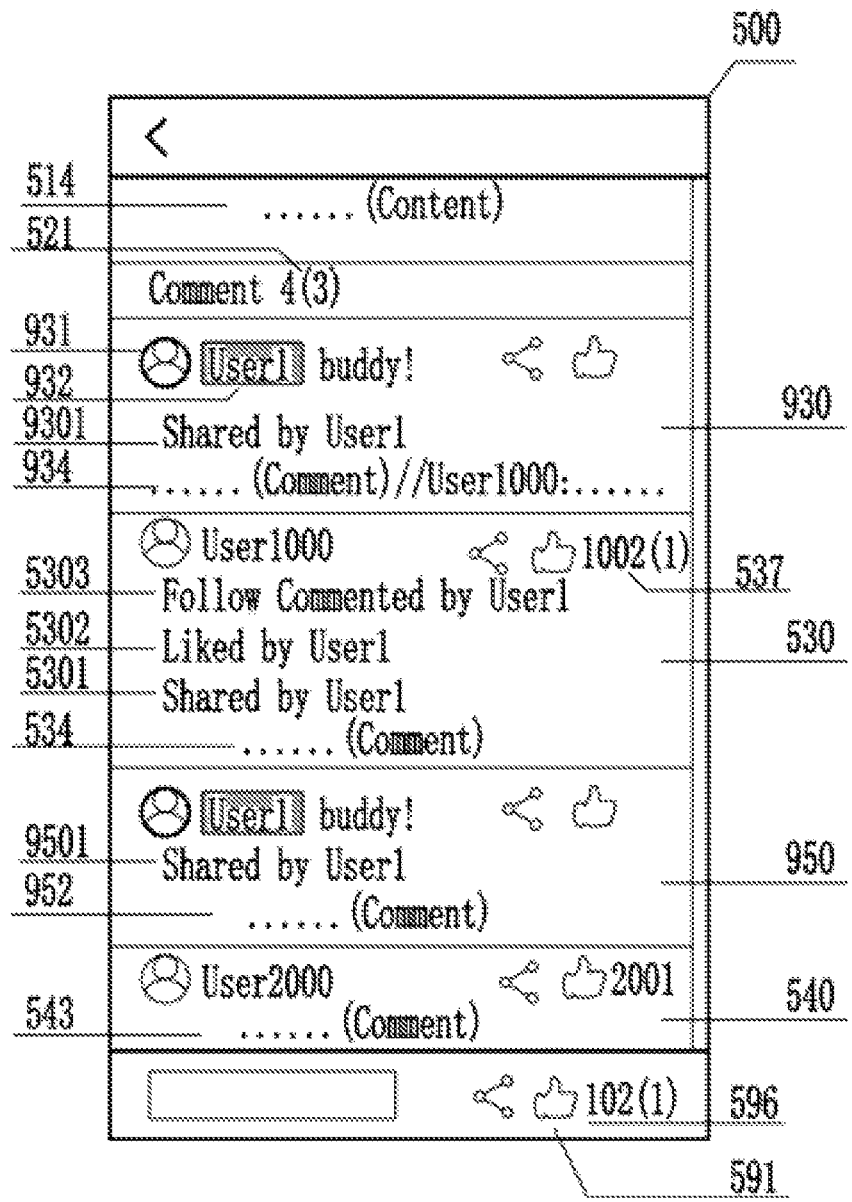
FIG. 10 is a display interface diagram of a comment area with specific sharing information according to an embodiment of the present disclosure.

The electronic content shown in FIG. 5 has only two comments 530 and 540. In this case, after the user User1 and the friend User3 log in to the APP respectively, the same interface shown in FIG. 4 and FIG. 5 is seen. If the user User1 initiates a friend sharing to the friend User3, that is, when sharing, the user User1 selects "User3" in the interface 600 of FIG. 6, after the friend User3 enters the APP again, the original interfaces of FIG. 4 and FIG. 5 are changed, and the changed interfaces seen by the User3 are shown in FIG. 8 to FIG. 10. FIG. 8 is a list of the electronic content similar to FIG. 4, and includes a display area 420 of electronic content entitled "Title 200". FIG. 9 is the full text display interface 500 of the electronic content similar to FIG. 5. The area 510 in FIG. 9 is slid upward to obtain the comment area as shown in FIG. 10. Since there are not many comments, all the comments are shown in the figure. The specific sharing operation of User1 on FIG. 5 and the detail changes of FIG. 4 and FIG. 5 seen by User3 before and after sharing, are shown in Table 1 below.

TABLE 1

| No. | Operation of User1 in FIG. 5 | Items before sharing | Items after sharing | Notes |
| --- | --- | --- | --- | --- |
| 1 | Clicking 591, and sharing the electronic content directly | — — | 4201 in FIG. 8 5101 in FIG. 9 | "Shared by User1" is added to indicate that the electronic content is shared directly to the User3 by friend User1. |

TABLE 1-continued

| No. | Operation of User1 in FIG. 5 | Items before sharing | Items after sharing | Notes |
|---|---|---|---|---|
| 2 | Clicking 592, and giving a like to share the electronic content | 426 in FIG. 4 596 in FIG. 5 | 426 in FIG. 8 596 in FIG. 9 | The number of likes to the electronic content changes from "101" before sharing to "102 (1)" after sharing, which means "total number of likes (number of likes to specific sharing)". After sharing, the "total number of likes" and the "number of likes to specific sharing" are each increased by 1. |
|  |  | — | 4202 in FIG. 8 | "Liked by User1" is added to indicate that the electronic content is given a like and shared to the User3 by the friend User1. |
|  |  | — | 5102 in FIG. 9 |  |
| 3 | Clicking 593, and sharing the electronic content through comment | 425 in FIG. 4 521 in FIG. 5 | 425 in FIG. 8 521 in FIG. 9 | When only this item is shared, the number of comments changes from "2" before sharing to "3 (1)", and then "4 (3)" after adding another sharing, which means "total number of comments (number of comments of direct sharing)". This sharing adds 1 to the total number of comments and 1 to the number of comments of direct sharing. |
|  |  | — | 950 in FIG. 10 | New comment area 950 is added where 9501 shows "Shred By User1". |
| 4 | Clicking 535, and sharing the comment directly | 425 in FIG. 4 521 in FIG. 5 | 425 in FIG. 8 521 in FIG. 9 | When only this item is shared, the number of comments changes from "2" before sharing to "3 (1)", and then "4 (3)" after adding other sharing. After sharing, the "total number of comments" remains the same, and only the "number of comments of direct sharing" is increased by 1. |
|  |  | — | 5301 in FIG. 10 | "Shared by User1" is added. |
| 5 | Clicking 536, and giving a like to share the comment | 427 in FIG. 4 537 in FIG. 5 | 427 in FIG. 8 537 in FIG. 10 | "3002" and "1001" before sharing change to "3003 (1)" and "1002 (1)" respectively, which means "total number of likes to comment (number of likesto comment of specific sharing)". This sharing adds 1 to the total number of likes to comment and 1 to the number of likes to comment of specific sharing. |
|  |  | — | 5302 in FIG. 10 | "Liked by User1" is added. |
| 6 | Clicking 534, and sharing the comment through comment | 425 in FIG. 4 521 in FIG. 5 | 425 in FIG. 8 521 in FIG. 9 | When only this item is shared, the number of comments changes from "2" before sharing to "3 (1)", and then "4 (3)" after adding other sharing. After sharing, the "total number of comments" remains the same, and only the "number of comments of direct sharing" is increased by 1. |
|  |  | — | 5303 in FIG. 10 | "Follow Commented by User1" is added, which indicates that the User1 follows the comment. |
|  |  | — | 930 in FIG. 10 | New comment area 930 is added, wherein 9301 shows "Shred By User1". |

425 in FIG. 8 is always consistent with 521 in FIG. 9, and after the subitems of the 3, 4 and 6 in the Table 1 are sequentially passed, the "2" changes to "3 (1)" and "3 (2)", and finally "4 (3)" successively, which represents a total of four comments, and the three of them are directly shared by other users.

In "Items after sharing" of the above table, various specific sharing of the friends is described through the prominent changes of FIG. 8 to FIG. 10 with respect to the corresponding areas in FIG. 4 to FIG. 5, that is, the specific sharing is displayed in a prominent manner. Besides various items in the above table, the method further includes adding 4203 in FIG. 8 after sharing, and adding 5103 in FIG. 9, both of which are displayed as "Share Comments By User1", indicating that the User1 performs at least one sharing related to the comments, that is, sharing in items 4-6 in the Table 1. The specific sharing details may be read in the comment area as shown in FIG. 10 according to the foregoing method.

In FIG. 10, 931 in the area 930 is a head picture of friend User1, and is bold at the periphery compared with non-friend users. 932 is the friend name User2, highlighted, and added with "buddy!" after it. These measures highlighting the identifier of the publishers of the comments of specific sharing indicate that the publishers of the comments themselves are also originators of the specific sharing, and belong to one of the prominent manners.

The number of the likes and the number of comments in the above items are all displayed in a similar "Total Number (Specific Sharing Number)" format. The number of specific sharing is represented by numerals in parentheses, and also belongs to one of the prominent manners. In another embodiment, other forms such as "Total Number [Specific Sharing Number]", "Total: Specific Sharing Number" or "Non-Friend Sharing Number+Friend Sharing Number" are employed. Meanwhile, these numbers are clicked, and a list of users giving a like and commenting can be displayed, wherein the names of users initiating the specific sharing are all listed in front. For example, 537 in FIG. 10 is clicked, and the interfaces of the users who give a like shown in FIG. 11 is displayed. Herein, a friend user "User1" who gives a like to the specific sharing is displayed below the "Shared by Buddies" 1101, and a user "User201" who gives a like only is displayed below the "Others" 1102. The forward position in FIG. 11 shows the sharing initiator. It is further possible to display friends that give a like but not initiate a specific sharing to the user between 1101 and 1102, or users who initiate a specific sharing but are not friends.

Where the list of the sharing initiator is listed, for example, 4201-4203 in FIG. 8, 5101-5103 in FIG. 9, if other friends besides User1, such as User5 and User6, initiate a sharing, the list of the sharing initiator may be displayed in the form of "Shared by User1, User5,", that is, if the screen is not wide enough, the list of the sharing initiator may be replaced with " . . . ". When all the sharing friends need to be viewed, the "Sharedby" in this row may be clicked, and a list interface of users initiating a specific sharing is displayed, which is similar to that shown in FIG. 11.

Displaying in a prominent manner also includes determining that a comment of specific sharing is located in the front position of the comment area, making it easy for a specific receiving user to find. For example, in FIG. 10, the comments of specific sharing of the friend User1 are respectively located in the areas 930, 530 and 950 from top to bottom, and are in front of the comments 540 without specific sharing. Thus, the user User3 can easily find the comments shared by the friends after reading the electronic content. In general, in the case that there are thousands of comments, the common comments in front of the specific sharing comments do not exceed 5-20, or do not exceed the height range of 1-3 screens, so that the receiving user can easily find the specific sharing. The embodiments herein place all of the specific sharing comments in front of the common comments.

The location order of the specific sharing comments is arranged in reverse order according to the sharing time in FIG. 10, that is, if the sharing of the items 3, 4, 5 and 6 is sequentially initiated in Table 1, the comment area 930 corresponding to the item 6, the comment area 530 corresponding to the items 5 and 4, and the comment area 950 corresponding to the item 3, are sequentially displayed from the top of the comment area after the sharing. Of course, the sharing comments may also be arranged in other order, for example, arranged in sequence according to the sharing time, or arranged according to the names of the sharing friends, or arranged in a sharing manner, such as, arranged in sequence of direct sharing, sharing through giving a like, sharing through comments, etc. The above methods may also be mixed. For example, the sharing comments are firstly arranged according to the names of the sharing friends, and then the sharing comments by the friends User1, User5 and User6 are successively displayed. If there are a plurality of times of sharing for each friend, the sharing comments are arranged in reverse time. Further, the arranging order may be varied by setting at the client.

For the electronic content with a specific sharing, such as electronic content with any specific sharing of items 1-6 of Table 1, the electronic content is arranged in the front position of the electronic content list. For example, under the label "Type1" 481 in FIG. 8, an area 420 of electronic content with specific sharing information is located in front of other electronic contents. Also, with respect to FIG. 4, a label "Share" 485 is added to the label field 480 in FIG. 8. After clicking, all the electronic contents with specific sharing are displayed.

Through the above description of the present embodiment, it can be found that, after the client of the electronic content APP is opened, the User3 can quickly and directly see the information of the specific sharing of the friend User1 displayed in a prominent manner, including whether there is friend sharing, which friend sharing, sharing manner, and the specific object of sharing, such as, the electronic content itself or the comment, etc. Furthermore, the same electronic content or comments may also be shared for multiple times. Hence, the sharing between friends is very direct, and does not need the third-party software, which improves the efficiency from the perspective of program operation. Furthermore, a sharing to friends by users also performs a common sharing to other users, for example, the user User1 inputs a comment once, so that the user can share to the friends and non-friends simultaneously, thereby improving the efficiency from the perspective of user operation.

Figure 7:
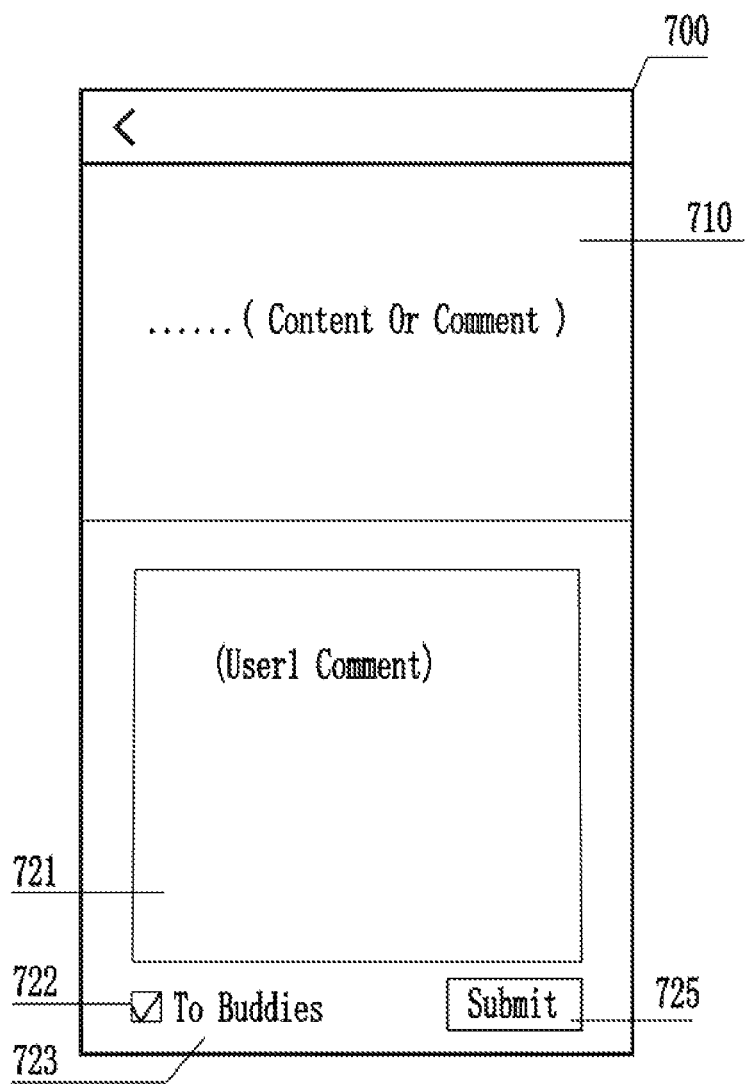
FIG. 7 is an interface diagram of publishing comments according to an embodiment of the present disclosure.

After the User3 sees the comment of the friend User1 in the area 930 in FIG. 10, the User3 further follows the comment, that is, the comment 934 is clicked, and the comment interface 700 shown in FIG. 7 is popped up. 710 displays the comment 934. The User3 ticks 722, clicks 723, and then selects a friend User1 from the popped-up friend selection interface 600 as shown in FIG. 6, or the system directly sets the sharing friend as User1 at this time, and the User3 can reply to the comment initiated by User1 in a manner of initiating comment sharing to User1. The User1 may reply the User3 in the same manner, and the two may respond to each other as long as possible.

In this way, the friends form a direct and continuous interaction within the electronic content APP through the described specific sharing operation including direct sharing, sharing through giving a like, or sharing through comment. The user and the friends share with each other, and also send their own attitudes and comments to other users which are not friends, so that the users which are not friends can also reply, and finally a double-circle interaction of a large user circle and a small friend circle is formed.

The implementations of the embodiments are described below.

The solution of the database is described firstly.

In the database of the embodiments, each record of the user table includes a unique identifier "user ID" data item of each user, and also includes data items such as "user name" and "login password". In the present embodiment, each record further includes a "location arrangement manner of specific sharing comment", as mentioned above, for example, according to a time positive order, a time inverse order, or other order.

In the friend relationship table of the user, each record includes data items such as "user ID" and "user ID of friend".

Each record of the electronic content table of the embodiment includes data items such as "electronic content ID", "title", "publish time", "author", "summary", "concrete content", and "type". The primary key is "electronic content ID", uniquely identifying one electronic content. The "concrete content" may be a static web page file address of the electronic content represented by a uniform resource locator (URL).

Each record of the comment table corresponds to a comment, including data items such as "comment ID", "electronic content ID corresponding to the comment", "comment ID corresponding to the comment", "comment publishing time", "user ID publishing the comment", and "comment content". Since each comment always belongs to one electronic content, that is, each comment always corresponds to one electronic content, the primary key may be set to the "electronic content ID corresponding to the comment" and "comment ID", and the two items together identify one comment. The object corresponding to each comment may be electronic content directly, and at this time, the "comment ID corresponding to the comment" is set to −1. Alternatively, the comment may be a certain comment published before, and the "comment ID corresponding to the comment" is set as the "comment ID" of the comment published before. For example, a comment with a "comment ID" of 100 is published before, and then a new comment is performed to follow the comment, and the "electronic content ID corresponding to the comment" of the two are the same. The "comment ID" of the new comment may be set to 100+1, that is, 101, and the "comment ID corresponding to the comment" in the new comment record is 100. On the contrary, the value of "electronic content ID corresponding to the comment" of the new comment and the value 100 of "comment ID corresponding to the comment" of the new comment are used as "comment ID" values to retrieve the comment table, and the original comment can be found, that is, the previous-level comment of the new comment. If the value of the "comment ID corresponding to the comment" of the new comment is −1, it indicates that the new comment does not have a previous-level comment, and the comment object is the electronic content itself.

The attitude table in the database is used to record the attitudes expressed by the user through behaviors such as giving a like. Each record includes data items such as "attitude ID", "electronic content ID corresponding to attitude", "comment ID corresponding to attitude", and "user ID publishing attitude". The primary key is the "attitude ID", "electronic content ID corresponding to attitude", and "comment ID corresponding to attitude", which together identify an attitude, wherein "electronic content ID corresponding to attitude" and "comment ID corresponding to attitude" together determine a certain electronic content or comment. In the present embodiment, each record represents a like of the user publishing attitude. In another embodiment, an "attitude value" is also included to indicate the attitude of the like or opposition of the user.

To implement specific sharing, the database further includes a sharing table that records specific sharing. Each record includes data items such as "sharing ID", "sharing electronic content ID", "sharing comment ID", "sharing attitude ID", "sharing initiating user ID", and "sharing receiving user ID". The primary key may be set to "sharing ID" and "sharing electronic content ID". For different manners of sharing, some of the data items are set as shown in Table 2 below.

TABLE 2

| Sharing manner | Sharing object | Sharing electronic content ID | Sharing comment ID | Sharing attitude ID |
|---|---|---|---|---|
| direct sharing | electronic content | The electronic content ID | −1 | −1 |
| | comment | The electronic content ID corresponding to the comment | The comment ID | −1 |
| sharing through attitude | electronic content | The electronic content ID | −1 | attitude ID |
| | comment | The electronic content ID corresponding to the comment | The comment ID | attitude ID |
| sharing through comment | electronic content | The electronic content ID | new comment ID | −2 |
| | comment | The electronic content ID corresponding to the comment | new comment ID | −2 |

The items "the electronic content" and "the comment" in the third column and the fourth column in the table are respectively "electronic content" and "comment" under the "sharing object" in the second column in the same row. The specific sharing manner may be determined according to the data item "sharing attitude ID" in the above table and also in the sharing record, as long as it is ensured that the "attitude ID" is not −1 or −2 during sharing through attitude. In addition, it is noted that when the user performs the specific sharing through the comment, the user directly shares a new comment that the user has just published. Hence, in the two rows of the table "sharing through comment", the "sharing comment ID" is set as the new comment ID.

With this sharing table, it is possible to retrieve all sharing records of the sharing receiver, for example, the user User3. Before the server of the APP sends an electronic content to the client of a user, the server of the APP firstly retrieves the table with the user ID and the electronic content ID. If the sharing information record is found, it may be displayed in a prominent manner in the page of the electronic content.

Since initiators and receivers of the sharing table are all the users, the sharing table may be large, and it will take more time to retrieve. It is noted that when the server pushes the electronic content to the client, the ID of the receiving user needs to be used for retrievalretrieved, so in another embodiment, the improvement is that a receiving sharing table is set for each user, and the sharing record of the receiving user for the user is stored. Because the receiver of each record is the user to which the table belongs, in each record of the table, the remaining data items are the same as those in the sharing table except for the "sharing receiving user ID". In this way, actually, a large sharing table is partitioned into a large number of receiving sharing tables which are smaller. Before the server sends an electronic content to a client of a user such as User3, the server may retrieve the receiving sharing table of the user User3 with only the electronic content ID, and find all the sharing records. Since the receiving sharing information table is much smaller than the sharing table, the retrieving operation will be quicker and more compliant with the requirements of actual application scenarios.

This embodiment adopts a relational database, such as one of MySql, SQL Server, Oracle, PostgreSQL, etc. In other embodiments, other types of databases may be used, such as NoSQL databases such as MongoDB and Redis, or even software-defined storage such as Ceph. The principles of implementation in the other embodiments are basically consistent with the present embodiment, and those skilled in the art may implement the principles by referring to the method of the embodiments herein.

Figure 12:
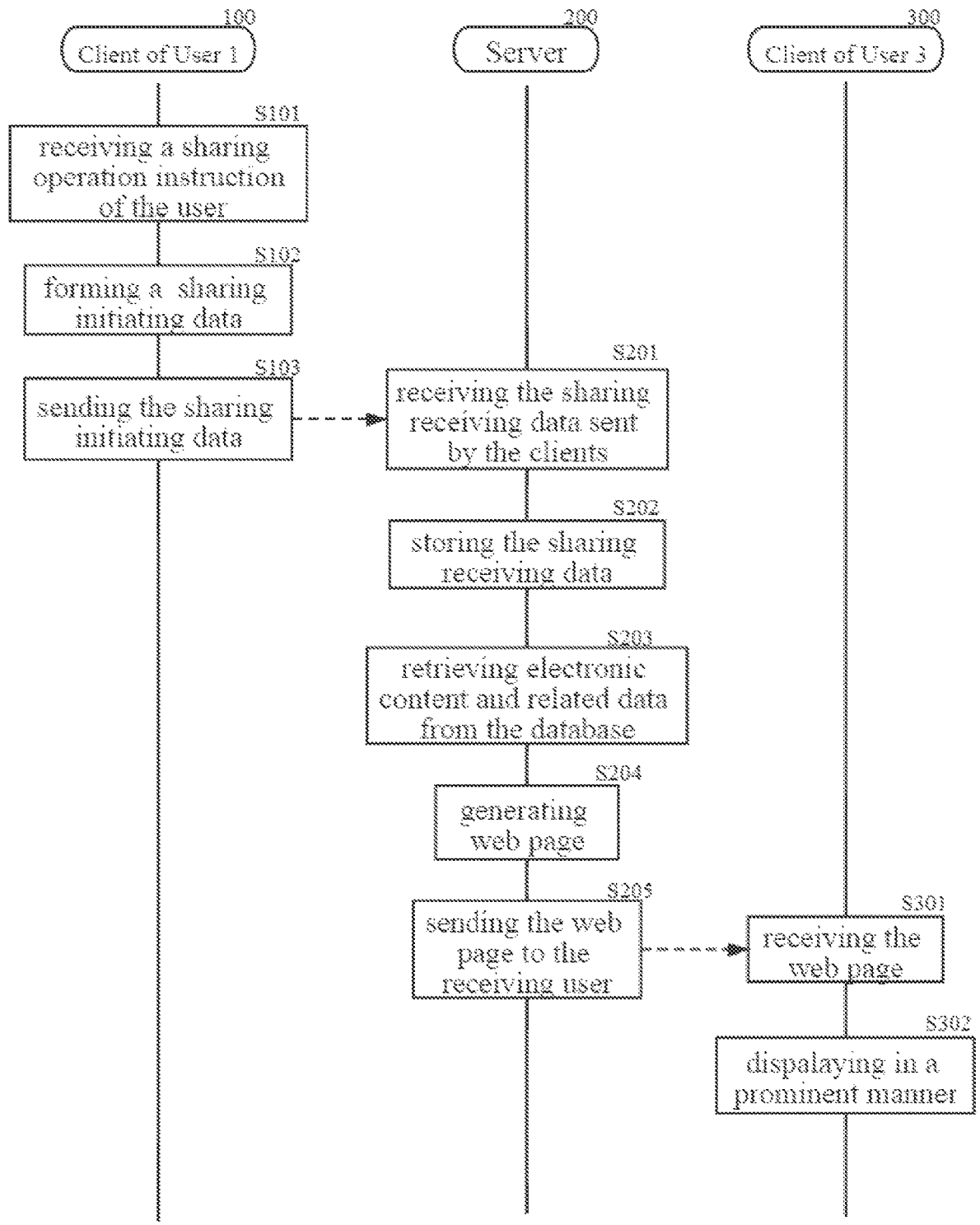
FIG. 12 is a flowchart of interaction between a client and a server according to an embodiment of the present disclosure.

FIG. 12 is a flow chart of implementation of this embodiment.

FIG. 12 is an illustration of a similar sequence diagram, and the vertical line without an arrow in the figure only represents a sequence. There are three participants in the figure, which are respectively a client 100 of a user User1, a server 200 connected to the clients, and a client 300 of the user User3. As shown in FIG. 1, an electronic content APP of the present disclosure is installed on each client. After the user User1 opens and logs in to the APP, the electronic content or the comment is directly shared to the friend User3, shared through giving a like or shared through comment as shown in Table 1. In FIG. 12, the client 100 of User1 receives the sharing operation instruction of the user (S101), and then forms sharing initiating data (S102). Finally, the sharing initiating data is sent to the server 200 (S103).

The sharing initiating data includes sharing object information, and is represented by "electronic content ID" and "comment ID". If the sharing object is the electronic content itself, the "comment ID" is set to −1. If the sharing object is a comment, the "comment ID" is set as the ID of the comment. For example, the sharing object information shared in the item 3 in Table 1 is ID of the electronic content of item 514 in FIG. 5 and −1, the sharing object information shared in item 6 in Table 1 is the ID of the electronic content of item 514 in FIG. 5 and the ID of the comment 534 in FIG. 5, respectively. The electronic content ID and comment ID of the above sharing object are sent to the client through the server by reading the corresponding ID number in the database when sending the electronic content or comment.

It should be noted that, when sharing through comment, since the new comment has not entered the database of the server, there is no ID number and the sharing initiating data also carries all the specific contents of the new comment. For example, it may be a text, a link, etc. represented by a character string, and may also be a picture, a video, etc. in a binary form.

The sharing initiating data further includes sharing manner information, such as direct sharing, sharing through attitude or sharing through comment. If the comments are shared, the comments need to include the specific content of the new comments as mentioned above.

The sharing initiating data further includes a sharing initiating user ID and a receiving user ID. The sharing initiating user is a user User1 that logs in to the client 100 and initiates the sharing. The sharing receiving user is determined when the user is sharing, for example, by the interface 600 in FIG. 6. Hence, in the step S101, after receiving the receiving user User3 selected by the user User1, the client sets the user User3 as the sharing receiving user in the sharing initiating data in the step (S102). In an embodiment where another user presets or the system sets a receiving user, the receiving user may be set as a receiving user in the sharing initiating data by the client in the step (S102) or by a server after S201 below.

While the client 100 sends the sharing initiating data, the server 200 receives the sharing initiating data (S201). In the embodiment where the user presets or the system sets the receiving user, if the receiving user is not set at the client, the server may also set the receiving user in the sharing initiating data immediately after this step is completed.

Figure 13:
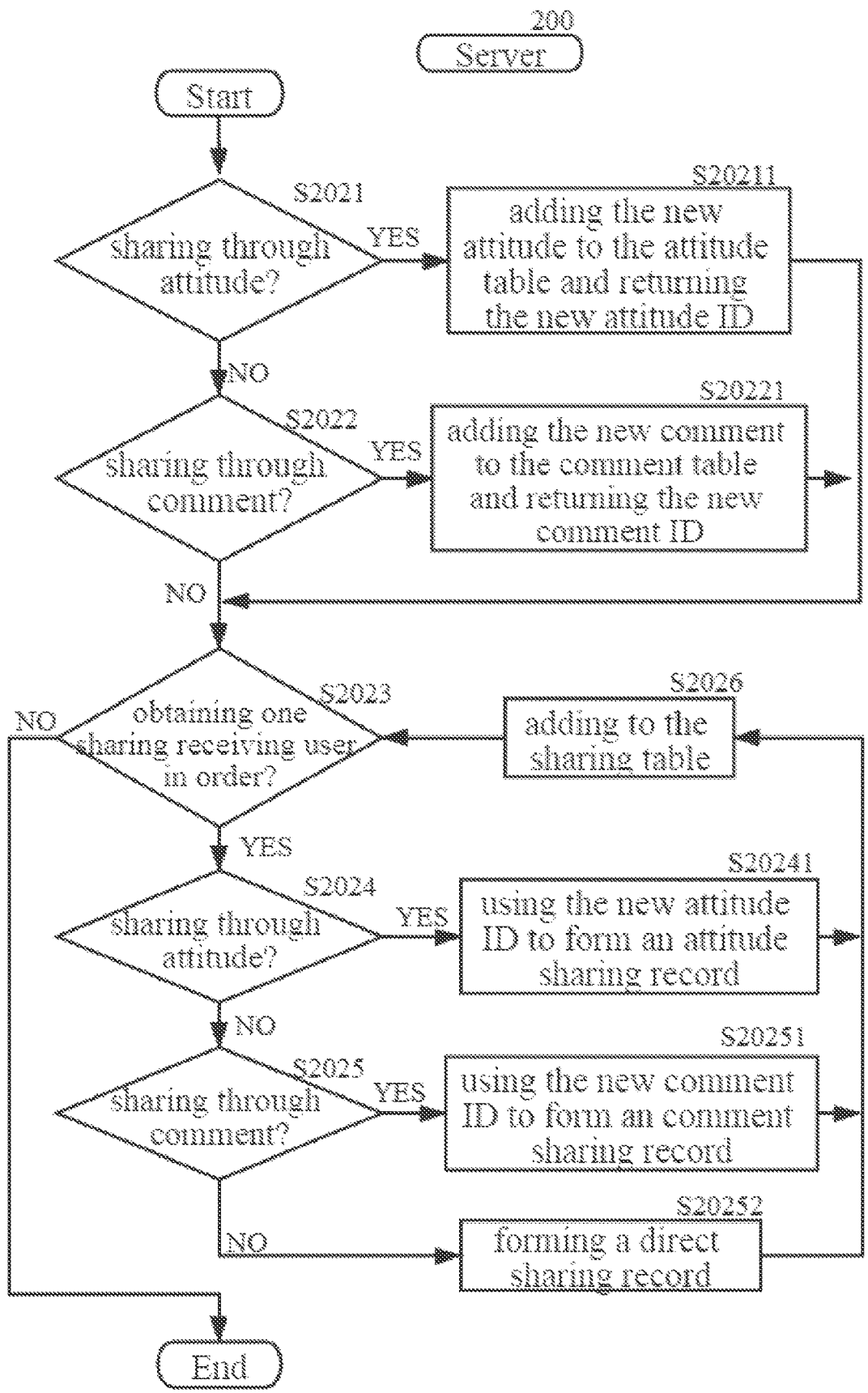
FIG. 13 is a flowchart of storing sharing initiating data according to an embodiment of the present disclosure.

Then, the server stores the sharing initiating data into the database (S202), and the specific process in this embodiment is shown in FIG. 13. In the figure, the server firstly determines whether the sharing manner in the sharing initiating data is sharing through attitude (S2021). If so, the new attitude is added to the attitude table, and the new attitude ID is returned (S20211). If not, the server determines whether the sharing manner is sharing through comment (S2022). If so, the new comment is added to the comment table, and the new comment ID is returned (S20221).

Then, it is checked whether it is a specific sharing, that is, one sharing receiving user is obtained in order, and it is judged whether it is successful (S2023). If it is successful, it is judged whether it is sharing through attitude (S2024). If it is successful, an attitude sharing record is formed (S20241) by the attitude ID returned in step S20211, and added to the sharing table (S2026). If not, it is continued to judge whether it is sharing through comment (S2025). If so, a comment sharing record is formed (S20251) by the attitude ID returned in step S20211, and added to the sharing table (S2026). If a negative conclusion is returned in step S2025, it indicates that it is a direct sharing record, and after the direct sharing record is formed (S20252), it is added to the sharing table (S2026).

In the above steps S20241, S20251 and S20252 of forming the sharing records, the "sharing electronic content ID", "sharing comment ID", and "sharing attitude ID" in each sharing record are set according to the foregoing Table 2. The "sharing manner" in the first column and the "sharing object" in the second column in the table are the sharing manner and the sharing object in the foregoing sharing initiating data, respectively. Furthermore, in the sharing through attitude, the "attitude ID" in table is a new attitude ID returned in step S20211, and in the sharing through comment, the "new comment ID" in the table is the new comment ID returned in step S20221. Thus, the corresponding data in the sharing records can be determined.

Further, as mentioned above, if each user in the database is further provided with a receiving sharing table, the step S2026 further includes adding a corresponding sharing record to the receiving sharing table of the sharing receiving user.

After completing S2026, the process returns to S2023 to continue acquiring the next sharing receiving user. If all the sharing receiving users are processed, the process returns to a negative conclusion. In this way, all the sharing data is stored in the database.

Referring back to FIG. 12, after completing storing the sharing data in step S202, if the User3 has logged in online, the server may actively send the sharing information to the client 300 of the User3. If the User3 is not online, the server may send the electronic content and the related sharing information according to the receiving request of the client of the User3 after the User3 logs in. Before sending, the corresponding electronic content and related data need to be retrieved in the database (S203), including the electronic content, the specific content of the comment thereof and related sharing data. The sharing data may be retrieved in the sharing table according to the electronic content ID and the receiving user ID, or only according to the receiving user ID. After finding the sharing record, on the one hand, the sharing object can be determined, that is, the corresponding electronic content table or comment table is retrieved according to the "sharing electronic content ID" and the "sharing comment ID" therein to obtain concrete electronic content or comment; on the other hand, a sharing manner may also be determined, and according to the data items of the "sharing attitude ID" being −1, −2, and other values in the sharing record in Table 2, the sharing manner is determined as direct sharing, sharing through comment, or sharing through attitude, respectively. The user table may also be retrieved according to the receiving user ID, and the "location arrangement manner of specific sharing comment" is extracted from the obtained user record. The process of obtaining the concrete sharing content and information according to the sharing record in this embodiment is shown in FIG. 14.

Figure 14:
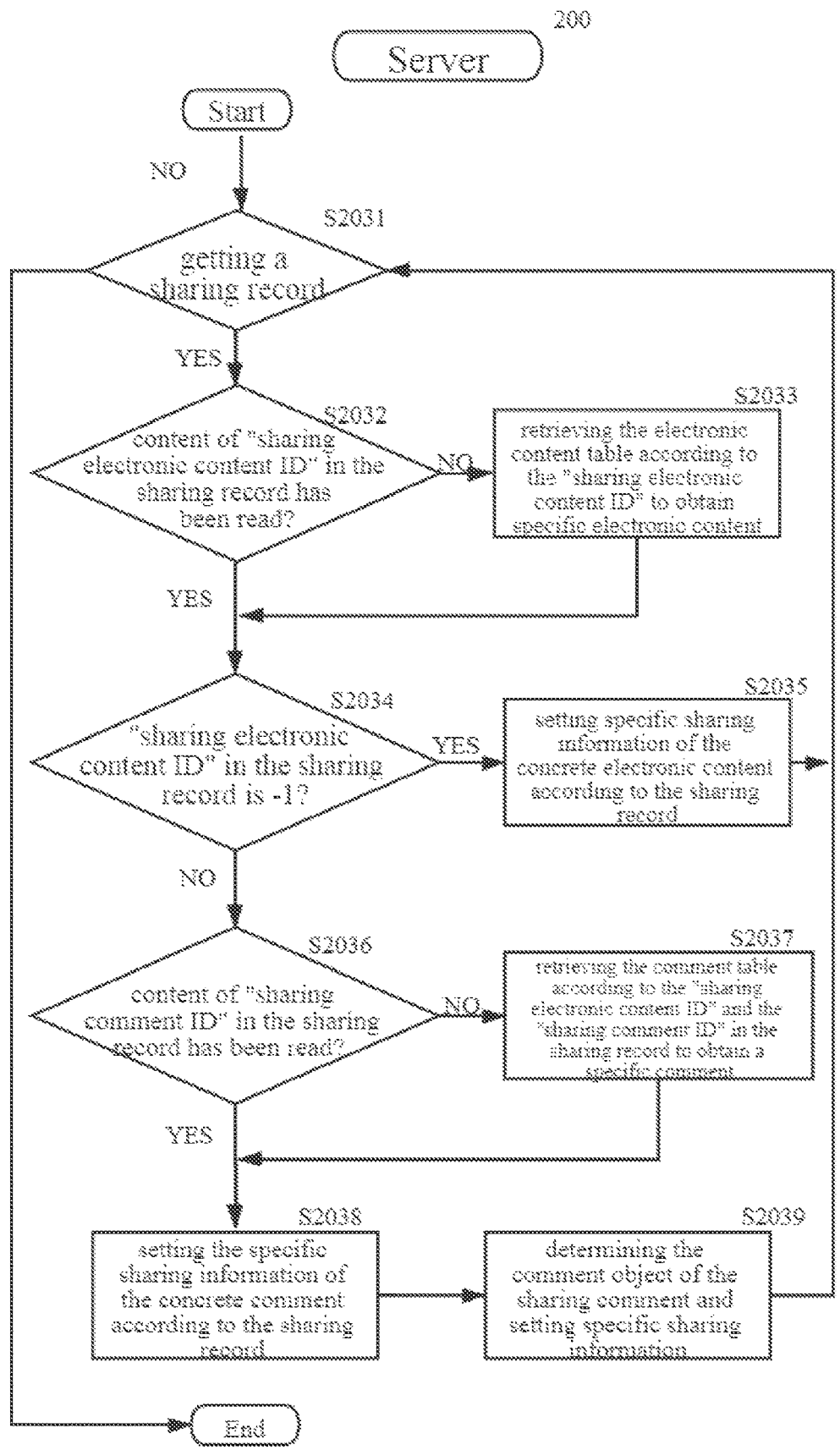
FIG. 14 is a flowchart of reading the data related to a sharing from a database according to an embodiment of the present disclosure.

In FIG. 14, after the start, a sharing record is acquired and it is judged whether the acquisition is successful (S2031). If so, it is determined whether the specific content corresponding to the "sharing electronic content ID" in the sharing record has been read from the database (S2032). If it is not read, the electronic content table is retrieved according to the "sharing electronic content ID" to obtain specific electronic content expressed in text or binary (S2033). Then, it is judged whether the "sharing comment ID" in the sharing record is −1 (S2034). If so, it indicates that the sharing object is the electronic content itself, and then the specific sharing information of the concrete electronic content is set according to the sharing record (S2035), including direct sharing or sharing through giving a like, and the user ID of the sharing initiating user. After the setting is completed, the process returns to step S2031 to obtain the next sharing record. If a negative conclusion is returned in step S2034, it indicates that the sharing object is a comment, and it is judged whether a specific comment corresponding to the "sharing electronic content ID" and the "sharing comment ID" in the sharing record has been read from the database (S2036). If not, the comment table is retrieved according to the "sharing electronic content ID" and the "sharing comment ID" in the sharing record to obtain the record of the sharing comment, so as to obtain a concrete comment (S2037). Then, the specific sharing information of the concrete comment is set according to the sharing record (S2038), including direct sharing or sharing through giving a like, and the user ID of the sharing initiating user. Then, the comment object of the comment is determined according to the foregoing method, and the sharing information of the comment object of the comment is set (S2039). For example, the comment object is a previous-level comment, and has not been read, then specific sharing information is further set after reading, such as being follow commented by User1, and this information is displayed in a prominent manner, as shown by "Follow Commented by User1" of item 5303 in FIG. 10. Finally, the process returns to S2031. After all the sharing records are processed, the process returns to the FALSE, and the retrieval is completed.

Referring back to FIG. 12, after step S203 is completed, a web page is generated according to the found electronic content and related data thereof (S204), and a specific sharing therein is displayed in a prominent manner. For example, a common dynamic web page technology including CGI, PHP, ASP, and JSP may be used to form a page file shown in FIG. 8 to FIG. 10 with the specific sharing. According to the sharing manner of the electronic content or the comments, it can be substituted into the second column of the Table 1, and the fourth column determines the prominent manner for displaying the specific sharing. For example, for the comment 534 in FIG. 5, it is known from the specific sharing information acquired in the previous step S203 that the sharing has a direct sharing, a sharing through attitude, and a sharing through comment. By retrieving the second column of "Operation of User1 in FIG. 5" in the Table 1, it can be seen that the specific sharing numbered 4-6 in the table are corresponding to the three sharing manners. Thus, the display mode may be determined with reference to the content corresponding to the fourth column "Items after sharing" in each row in the table. For other prominent display modes of specific sharing, for example, the arrangement position and order of specific sharing comments, the data statistics and display of specific sharing in each sharing manner, the arrangement position of electronic content with specific sharing information in an electronic content list interface, etc., all refer to other items in the table and above related description. Since those skilled in the art can generate the described page file according to the existing data, the details are not described herein again. In another embodiment, the server side does not generate the web page, but directly sends the data read from the server to the client, and then, the displaying of the specific sharing in a prominent manner is completed on the client.

When the server sends the synthesized electronic content and related data thereof to the client 300 of the receiving user User3 (S205), the client 300 of the User3 receives the web page data (S301), and displays the web page data in a prominent manner on the screen (S302), as shown in FIG. 8 to FIG. 10. Further, when the user User3 is reading other electronic content on the electronic content APP, or even when the electronic content APP is not used, the client 300 may send prompt information, and may be displayed after the user User1 clicks.

Figure 3:
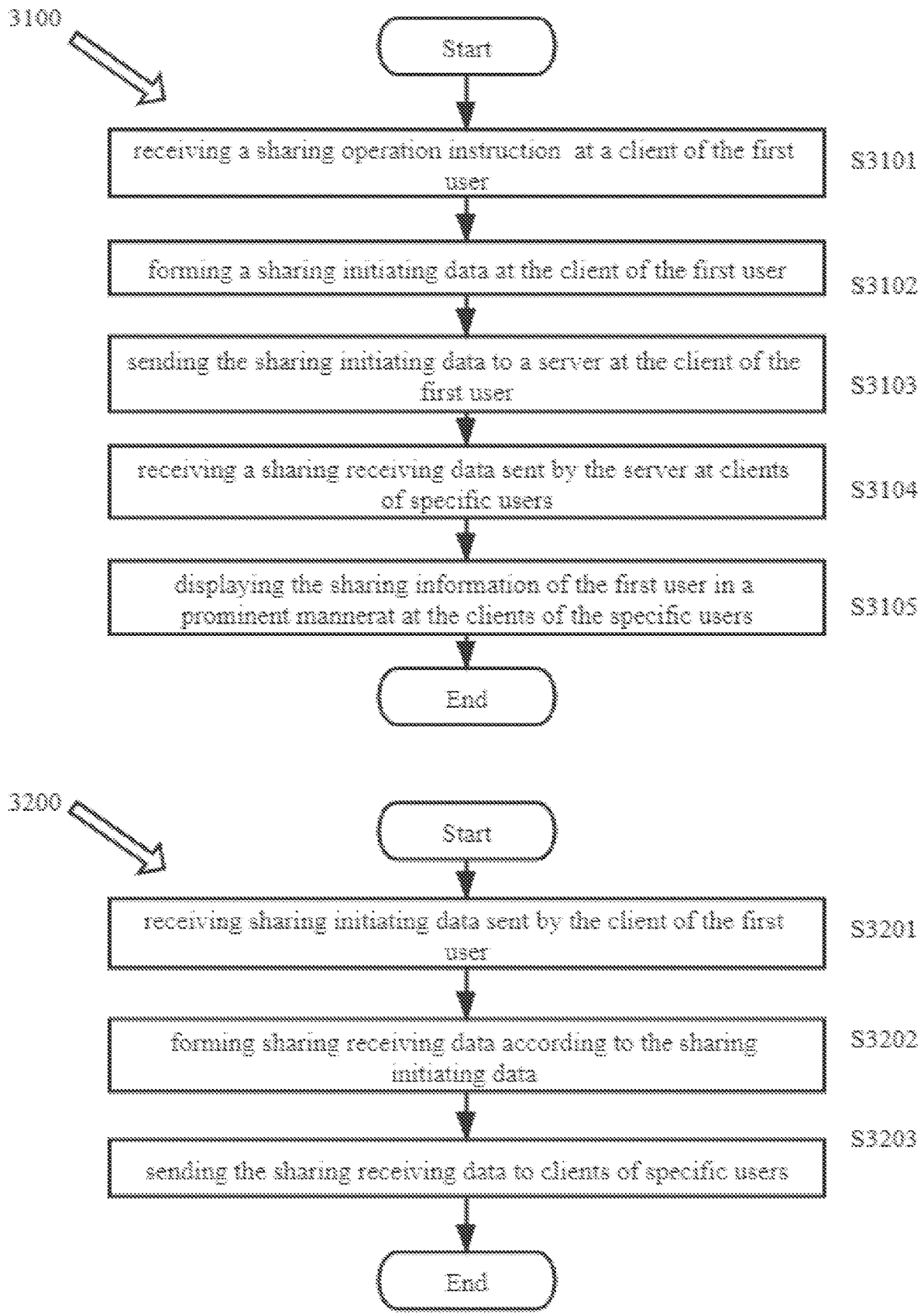
FIG. 3 is a flowchart of a client and a server according to an embodiment of the present disclosure.

It can be seen from the above embodiments that the method of the present disclosure, applied to a client, referring to the flow chart 3100 of FIG. 3, includes the following steps:

step S3101: receiving a sharing operation instruction of a first user for electronic content or comments at a client of the first user, such as step S101 in FIG. 12. The sharing operation may be direct sharing, sharing through attitude, or sharing through comment;

step S3102: forming a sharing initiating data related to the sharing operation at the client of the first user, such as step S102 in FIG. 12;

step S3103: sending the sharing initiating data to a server at the client of the first user, such as step S103 in FIG. 12;

step S3104: receiving a sharing reception data related to the sharing operation sent by the server at clients of specific users, such as step S301 in FIG. 12;

step S3105: displaying the sharing information of the first user in a prominent manner at the clients of the specific users according to the sharing reception data, such as step S302 in FIG. 12.

The specific users are the sharing receiving users determined by the first user at the time of sharing, preset by the first user, or set by the system.

The method of the present disclosure, applied to a server, referring to the flow chart 3200 of FIG. 3, includes the following steps:

step S3201: receiving sharing initiating data sent by a client of a first user, such as step S201 in FIG. 12;

step S3202: forming sharing receiving data according to the sharing initiating data, such as steps S202-204 in FIG. 12;

step S3203: sending the sharing receiving data to clients of specific users, such as step S205 in FIG. 12, wherein the sharing information of the first user is displayed in a prominent manner after the clients of the specific users receive the sharing receiving data.

The specific users are sharing receiving users included in the sharing initiating data, and receiving users preset by the first user, or set by system.

In another embodiment, the specific sharing receiving users may be determined by a third-party number. The third-party number is a mobile phone number or an account of the third-party platform. The following method is used for implementation.

In the user table in the database of the server 200, data items such as an associated mobile phone number and one or more associated third-party platform accounts are added. For example, the mobile phone number associated with the user User3 is Number3, and the account ID of the associated WhatApp is WUserID3.

In step S101 in FIG. 12, the receiving user is determined by the third-party number. For example, the user User5 shares the electronic content 514 in FIG. 10 through giving a like, and the contact list of the mobile phone is displayed after clicking item 681 on the interface 600 shown in FIG. 6, and the mobile phone number Number3 selected by the user is received. Or the user User6 shares the comment 934 in FIG. 10 through giving a like, and the friend interface of the WhatApp is called after clicking item 682 on the interface 600 shown in FIG. 6, and the ID number WUserID3 of the friend in the WhatApp returned after the selection of the user is received. These are all the prior art.

When the sharing data is formed in step S102, the receiving user is set as a third-party number, such as Number3, or an account WUserID3 belonging to WhatApp.

In step S202 of storing the sharing initiating data in FIG. 12, it is first detected whether the receiving user is a third-party number. If so, the user table needs to be retrieved according to the third-party number. If the corresponding user record is found, the third-party number of the receiving user, such as Number3 or WUserID3, in the sharing initiating data is replaced with the user ID of the APP of the record, such as the ID number UserID3 of the user User3, and then the operation of storing the sharing initiating data is performed according to step S203. If it is not found, specific sharing cannot be performed, and the next step is performed after the receiving user is emptied. Alternatively, a message of specific sharing may be sent to the third-party number, such as Number3 or WUserID3, and may appear on the third-party platform.

Figure 15:
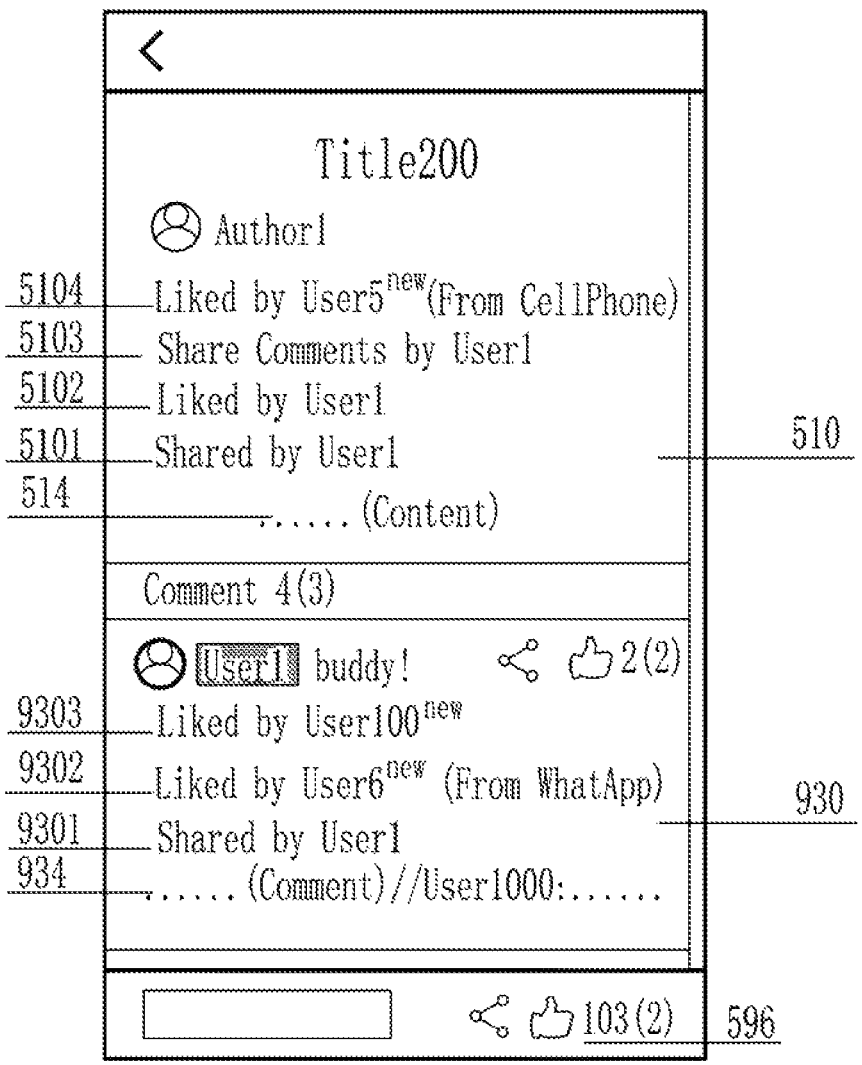
FIG. 15 is a display interface diagram of electronic content and comments with specific sharing information according to an embodiment of the present disclosure.

Through the above processing, after the process in FIG. 12 ends, the user User3 can see the specific sharing, such as the strings 5104 of the area 510 in FIG. 15, made by the User5 and the User6 through the third-party number. The following "(From CellPhone)" indicates that the User5 performs the sharing through giving a like by selecting the mobile phone number of the user User3. The "(From WhatApp)" behind the strings 9302 in the area 930 in the figure indicates that the User6 performs the sharing through giving a like by selecting the WhatApp account of the user User3. In another embodiment in which the receiving user is preset by the user, the receiving user may be set by the third-party number. The third-party number may also be converted into an account of the electronic content APP of the present disclosure with reference to the above flow.

In another embodiment, a common sharing of the followed users is also displayed in a prominent manner. The followed users are generally notable characters, and more than tens of thousands of followers want to be friends, but may not be realized. Hence, the followers can only follow these notable characters, and these notable characters are followed users of the followers. In general, the followers can only pay attention to the electronic content actively published by the followed user, for example, through an article published on a personal home page on Weibo. If the followed user only performs common sharing behaviors such as giving a like and commenting in the electronic content APP, in the prior art, since such behaviors of the followed user are not displayed in a prominent manner, the followers are likely not to see the behaviors.

For example, the User1 to User10 all follow the User100. When the User100 gives a like in the area 930 in FIG. 10, in this embodiment, the User3 sees that the common sharing of the User100 is converted into a specific sharing and is displayed in a prominent manner, for example, as shown by "Liked by User100" in the area 930 in FIG. 15.

In order to display the common sharing of the followed user in a prominent manner, in the embodiment shown in the flowchart of FIG. 12, the following modifications may be made:

adding a followed user table of the user, and including "user ID", "followed user ID", etc., in each record. The "followed user ID" may be retrieved according to the "user ID", and all the "user ID" may also be retrieved according to the "followed user ID".

After receiving the sharing initiating data from the followed user client in step S201 in FIG. 12, the server retrieves the followed user table by using the sharing initiating user ID as the "followed user ID" in the sharing initiating data, and finds all corresponding "user ID", that is, the followers of the sharing initiating user. Then, the ID of each follower is added to the receiving users in the sharing initiating data. Then, the server may send the sharing of the followed user to all the followers according to the following flows in FIG. 12, and display the sharing of the followed user in a prominent manner. In this embodiment, the server sets the followers of the initiating user as the receiving users. In another embodiment, as described above, the client may also set the followers as the receiving users in step S102. Both cases belong to the mode that the system sets the receiving users.

Further, the user may preset that only part of the followed users need to be highlighted.

In another embodiment, when sharing through comment, further, for example, when the user User1 selects a specific receiving user through the interface of FIG. 6, the "Only Share to Selected Buddies" of item 683 in the lower part of the figure are hooked, indicating that only the newly published comments are shared to the selected user, and not shared to the common users. That is, in addition to the selected specific sharing users such as User3, other users such as User23 will not see the new published comments when User1 performs sharing through comment. This enables a specific sharing to have a certain privacy. The implementation method is as follows:

adding a flag of whether or not disclosed in the comment table.

In step S101 in FIG. 12, the method further includes: receiving a setting of whether the first user discloses the sharing. In other embodiments, it may be set by the system.

In step S202 of storing the sharing initiating data in FIG. 12, more specifically, when a new comment is added to the comment table in step S20221 of FIG. 13, the new comment record further includes a flag of whether or not disclosed in the comment initiating data.

In step S203 of retrieving from the database in FIG. 12, if the retrieved comments have an undisclosed flag, the retrieved comments are read from the database only during specific sharing, and the retrieved comments are not read in other cases. For example, the server finds that the comment record has an undisclosed flag, and then judges whether the comment is retrieved according to a specific sharing record. For example, in step S2037 in FIG. 14, the comments are retrieved according to the comment ID in the sharing record. At this time, the content of the comments may be read. In other cases, that is, in a case where a receiving user such as User 23 is a common user rather than a specific receiving user, the content of the comment is not read, and thus the content of the comment cannot be displayed on the client of the receiving user User23. In another embodiment, in addition to the comments, when publishing the electronic content, a specific receiving user may also be set to perform an undisclosed specific sharing. The implementation mode may be referred to the described undisclosed sharing through comment.

In another embodiment, an unread mark is added in an unread specific sharing. For example, on the basis of FIG. 9 and FIG. 10, there is a sharing of a new friend to the User3, and on the interface shown in FIG. 15, "new" is annotated at the upper right of the new sharing initiating user, such as 5104, 9302 and 9303 items in FIG. 15. The implementation method is described as follows:

adding a "read mark or unread mark" of the receiving user in the record to the specific sharing table.

In step S202 in FIG. 12, when a sharing record is added to the database, the "read mark or unread mark" is set as no;

In step S203 in FIG. 12, more specifically, in step S2035 and step S2038 in FIG. 14, when specific sharing information is read from the sharing record, a mark of "read mark or unread mark" is included;

In step (S204) of generating the web page in FIG. 12, the method includes converting the "read mark or unread mark" in the specific sharing information into a corresponding mark in the display page. For example, when the "read mark or unread mark" in the sharing record corresponding to items 5104, 9302, and 9303 in FIG. 15 is detected as no, the "new" mark indicating the specific sharing is unread is added;

In step S302 of client displaying in FIG. 12, an unread mark is displayed on the unread specific sharing information;

After the client determines that the specific sharing information has been read, the information that the corresponding specific sharing has been read is generated;

The client returns the read information to the server, so that the server sets the corresponding sharing record as read, so that when the same sharing is displayed again next time, a new sharing mark is no longer displayed.

In another embodiment, the receiving user may also set that it is allowed to receive or refuse the specific sharing of only one or more initiating users. The implementation method is that, firstly, in the user table of the database, the "allowed initiating user ID" is added, for example, UserID701 and UserID702, indicating that only the specific sharing initiated by the user ID of UserID701 and UserID702 are received, and the specific sharing initiated by other users is not received. Alternatively, the data item of the "refused initiating user ID" is added to the user table, such as, UserID711 and UserID712, and all other specific sharing may be received except the specific sharing initiated by the user UserID711 and UserID712.

In the implementation process, for example, in step S202 of storing sharing initiating data in FIG. 12, more precisely in step S2023 in FIG. 13, after obtaining a sharing receiving user, the sharing receiving user ID is further used to retrieve the user table. After finding, it is also necessary to check whether the sharing initiating user ID in the sharing initiating data is included in the "allowed initiating user ID" in the receiving user record, or whether it is not included in the "refused initiating user ID" in the receiving user record. If the checking result is positive, the result returned by step S2023 is yes, and the following S2024 may be continued. If the checking result is negative, then the next sharing receiving user is acquired in sequence, and the above process is repeated until all sharing receiving users have been processed, and the result returned by step S2023 is no.

An embodiment of adding an instant messaging function is described below.

Figure 16:
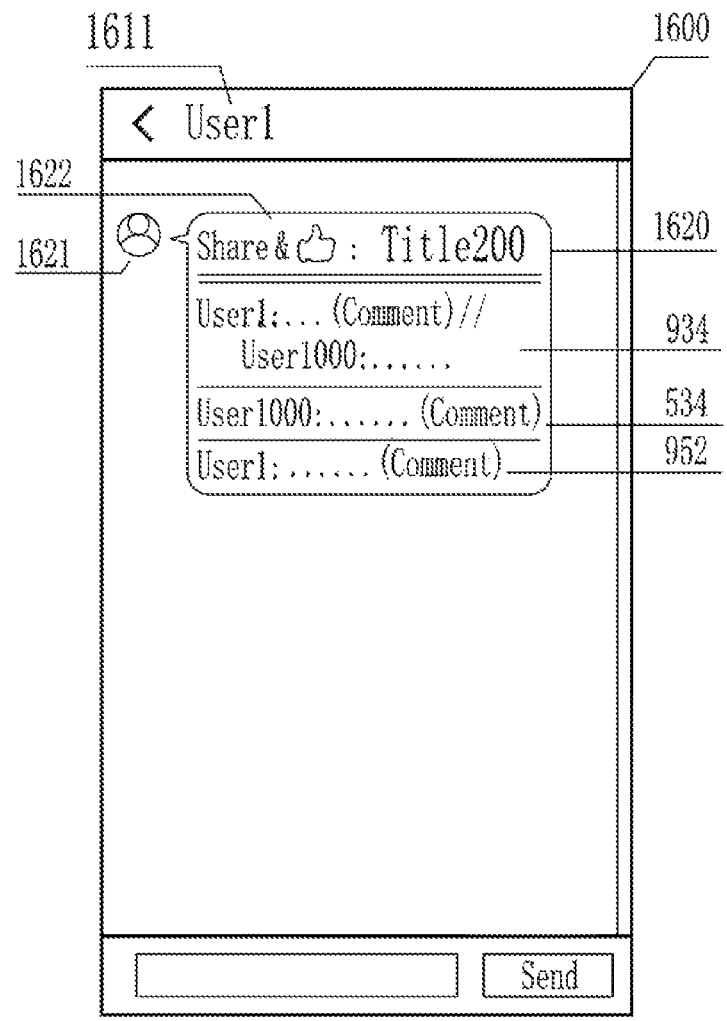
FIG. 16 is an instant messaging interface diagram of an embodiment of the present disclosure.

Since the friends can comment and interact with each other on the same electronic content through the electronic content APP of the present disclosure, naturally, there are other incidents irrelevant to the electronic content between the friends, and a separate communication is needed. Hence, in order to facilitate individual instant contact between the friends, naturally, an instant messaging function can be introduced into the electronic content APP. Compared with FIG. 8 to FIG. 11, as long as the user User3 double clicks any other user name, as long as the user is a friend, such as the User1, the electronic content APP opens the dialog interface of the instant messaging between User3 and User1, as shown in FIG. 16, so that the two can communicate under this interface; if the user is not a friend, the adding friend interface is entered. During instant messaging, the server may receive messages of instant messaging sent by a client of a user, record the messages into the instant messaging database, and then send the messages to a client of another user of instant messaging. Instant messaging is the existing mature technology, and can be realized by those skilled in the art.

Further, specific sharing information may be displayed directly in an instant messaging interface with a friend. Taking FIG. 10 as an example of sharing information, if the user User3 opens the instant messaging interface with the friend User1, the sharing information of the user User1 is displayed. The embodiment is shown in FIG. 16, which is an instant messaging interface with the friend User1 opened by the user User3, wherein 1611 denotes that a dialog friend is the User1, 1621 denotes the head picture of the User1, and information shared by the User1 is displayed in the message box 1620. The "Share" and symbol of giving a like before item 1622 indicate that the electronic content represented by the immediately following header "Title 200" is directly shared and shared through giving a like by User2. In the message box 1620, the following comments 934, 534, 952 are comments with the same numbers in FIG. 10, respectively, and before the colon at the beginning of the comment is the publisher of the comment. A display interface of the electronic content shown in FIG. 9 is displayed after the inside of box 1620 is clicked, and as shown in FIG. 10 after sided, so that a specific sharing is displayed in a significant manner.

The method for inserting a sharing message comprises: after the step S202 of storing the initiating sharing data shown in FIG. 12, forming a message containing a link pointing to the electronic content from the specific sharing by the server, inserting the message into a database of instant messaging between User3 and User1, sending the message to the client of the two, and displaying the message on the clients.

An embodiment of adding friends using a third-party number is described below.

In most cases in an application, a specific sharing may be sent to the friends. However, in the prior art, there are many methods for adding the friends. In one embodiment, not only the methods for adding friends in the prior art, but also a method for adding friends using a third-party number makes the user add friends more conveniently and quickly. The implementation method is as follows.

The client receives a friend adding command of the user, including a third-party number identifying the friend. For example, the mobile phone number Number3 is selected in the popped-up contact list, or the WUserID3 is selected in the popped-up friend interface of WhatApp.

The friend adding request including the third-party number is sent to a server.

The server retrieves a user table according to the third-party number in the friend adding request, and if the user ID of the electronic content APP of the present disclosure corresponding to the third-party number is found, the user ID replaces the third-party number in the friend adding request, and processes it according to the general friend adding request belonging to the prior art, for example, sends a friend adding request to the client of the user ID. If the user ID is not found, a message for adding a friend request may be sent to the platform corresponding to the third-party number.

The server sends a result of adding friend back to the client.

An embodiment of a comment chain is described below.

The embodiment further includes a method of displaying a comment chain. For one comment, if the object of the comment is also a comment, for example, the comment 934 in FIG. 10 comments the comment 534. The comment 534, which is a comment object, is the previous-level comment of the comment 934. Each comment has a unique previous-level comment, and the previous-level comment of each comment is traced one by one until the electronic content itself forms a comment chain.

Figure 17:
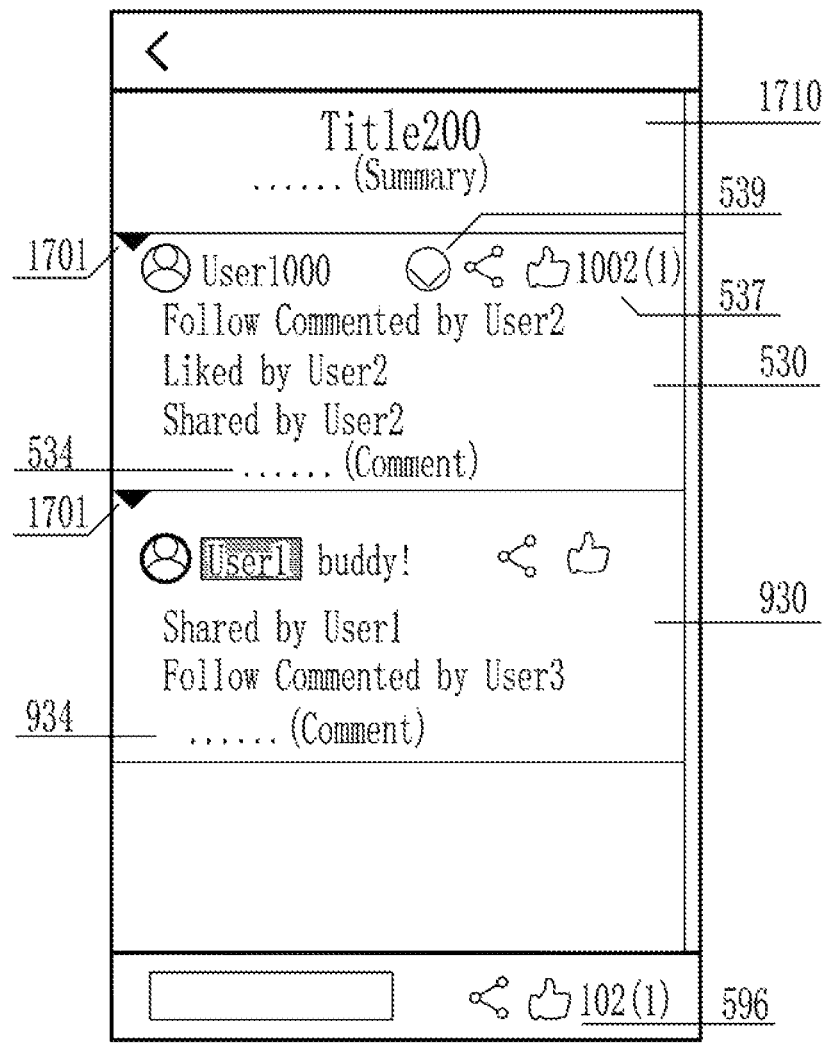
FIG. 17 is a display interface diagram of a comment chain according to an embodiment of the present disclosure.

For example, when User3 clicks the comment 934 of the friend User1 in the area 930 in FIG. 10, the comment interface 700 shown in FIG. 7 appears. At this time, the User3 does not input the comment, but presses the comment content in 710 and slides downward. At this time, the interface shown in FIG. 17 is displayed. In other embodiments, for example, a double clicking comment 934 may also be employed to display a comment chain that takes the comment 934 as a starting point.

The symbol 1701 in the area 930 in FIG. 17 indicates that this area is a direct following comment area of the comment 534 in the upper area 530. The 1701 symbol of the upper area 530 indicates that the area 530 is the area of the direct comment of the upper electronic content area 1710. In the figure, the comment chain starting with the comment area 930 is represented by two symbols 1701, and all direct or indirect previous-level comments of the comment 934 in the area 930 are displayed, such as comments 534 in the area 530, up to the upper-most electronic content summary display area 1710. Through this interface, all direct or indirect previous-level comments of a comment can be retracted.

According to the foregoing method, when two friends interact with each other, the friend comments of the other party may be constantly commented. With the interface of the comment chain of FIG. 12, the interaction between two users can be clearly seen.

Taking the embodiment shown in FIG. 17 as an example, the implementation mode of the comment chain is as follows.

1. The client receives a user instruction to display the comment chain, and sends the instruction to the server.

Figure 18:
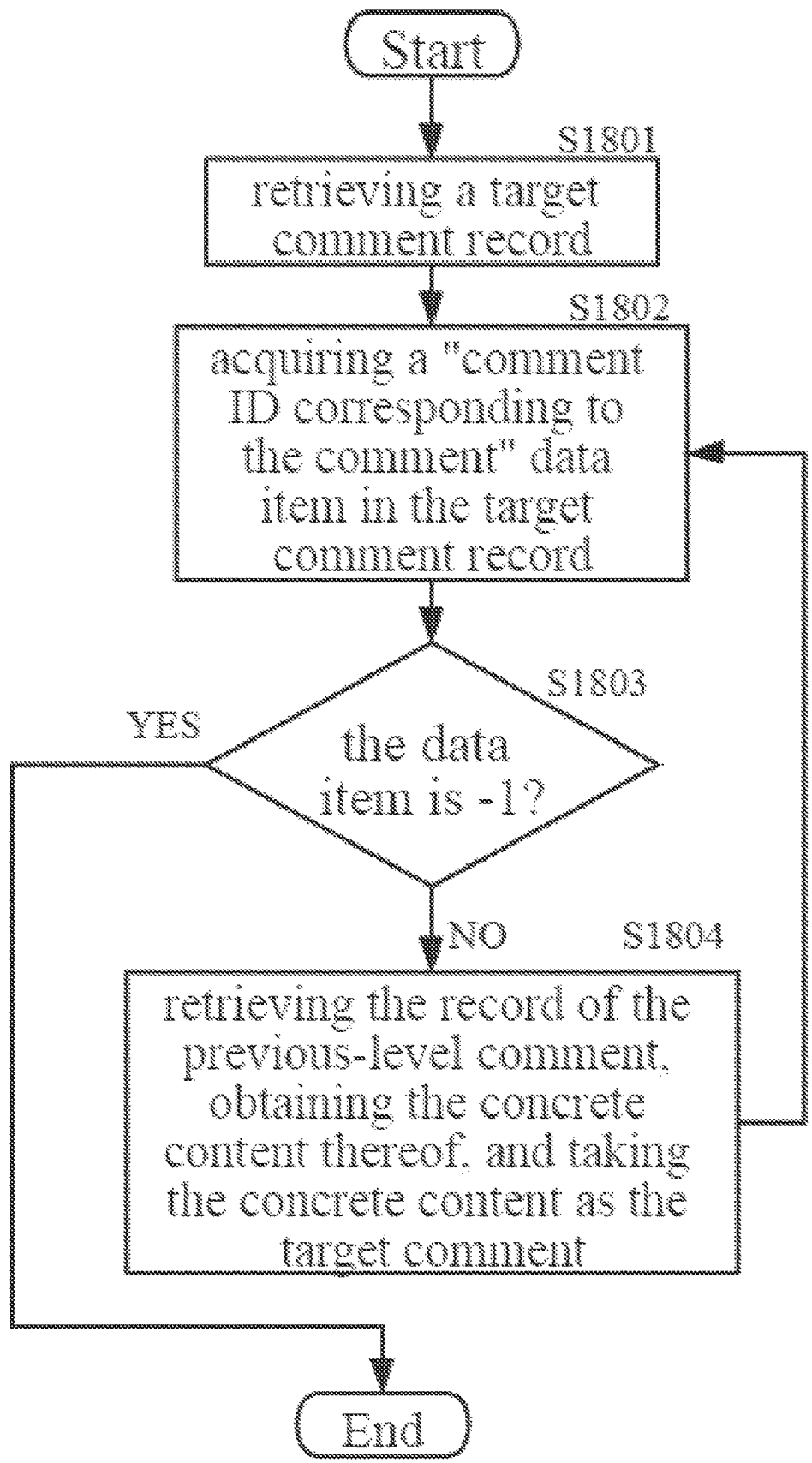
FIG. 18 is a flowchart of retrieving for comment chain data by a server according to an embodiment of the present disclosure.

2. After obtaining the instruction sent from the client, the server reads relevant data from the database. For example, the comment chain takes the comment 934 in FIG. 10 as the starting point. The read process may be performed according to the flow chart shown in FIG. 18. Firstly, the comment table is searched with the electronic content ID and the comment ID of the target comment 934, and the target comment record is retrieved (S1801). Then, a "comment ID corresponding to the comment" in the target comment record is acquired (S1802). It is judged whether the data item is −1 (S1803). If the data item is not −1, the comment table is searched with the data item as the comment ID to retrieved the record of the previous-level comment to obtain the concrete content of the previous-level comment, such as, the comment 534 in FIG. 12, and the previous-level comment is taken as the target comment (S1804). Returning back to step S1802, the described operation is repeated, and if the data item is −1, it indicates that there is no previous-level comment, and the retrieval is ended.

3. The server forms the web page data of the comment chain from all the found comment data and returns the web page data to the client.

4. The client receives the web page data of the comment chain, and displays the web page data. Further, only comments of specific sharing are displayed.

The foregoing embodiment retrieves all previous-level comments of a target comment. In another embodiment, next-level comments of the target comment may be retrieved.

In the comment table, a record of the target comment is determined.

The comment table takes the record of the target comment as a starting point to retrieve the records of the comments after the target comment one by one.

Each of the data items of records of the comments after the target comment is checked. If the "electronic content ID corresponding to the comment" is the same as the "electronic content ID corresponding to the comment" of the target comment, and the "comment ID corresponding to the comment" is the same as the ID of the target comment, the comment after the target comment is the next-level comment of the target comment, that is, the following comment.

Step 3 is repeated to the end of the comment table, and all next-level comments of the target comment are found.

Each next-level comment is taken as a target comment, and steps 2-4 are repeated to find all direct or indirect next-level comments.

Through this method, all next-level comments of a comment can be found and displayed. Further, only comments of specific sharing are displayed.

Embodiments applied to the management field are described below.

The method of the present disclosure, starting with the electronic content and branching to comments, may constitute a comment system. Since one comment has only one previous-level electronic content or comment, and has one or more next-level following comments, the comment system structurally forms a tree graph of graph theory meaning.

Figure 19:
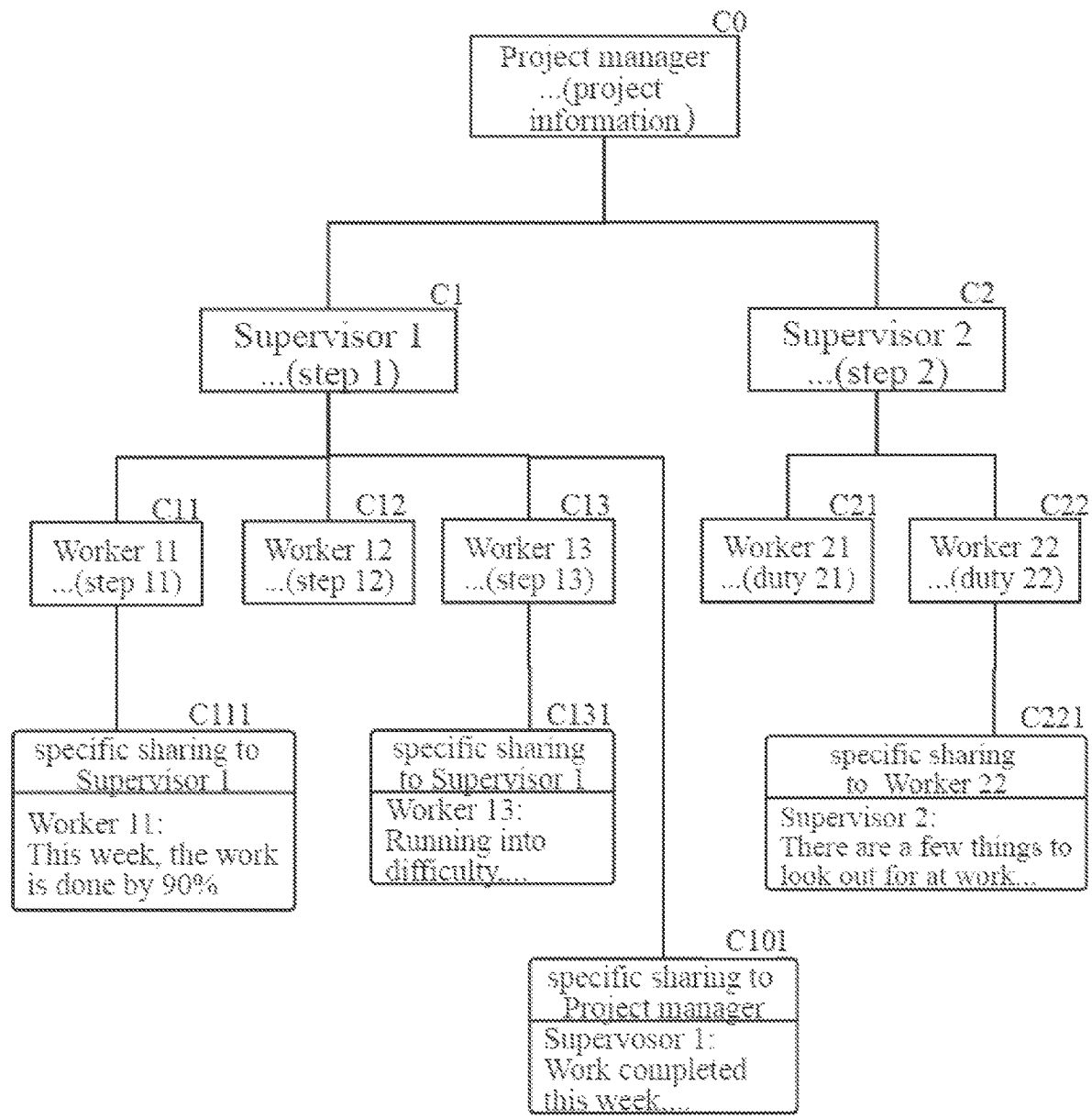
FIG. 19 is a tree graph of comment nodes applied to project management according to an embodiment of the present disclosure.

The comment system shown in FIG. 19 is an embodiment applied to project management. The project represented by the root node C0 is stepwise subdivided to form a project tree graph. For example, the electronic content of the root node C0 in the first row describes the overall information of the project. The comments of the nodes C1 and C2 in the second row are respectively two simultaneously executable steps 1 and 2 of the project. The comments of the nodes C11, C12 and C13 in the third row are three consecutive "steps 11"-"step 13" respectively required for completing step 1 in C1. The comments of the nodes C21 and C22 in the third row are respectively the responsibility of two workers who complete the "step 2" in C2 together. The publisher of each comment can be set to be the person in charge or the person who implements each work step. For example, the comment of the node C1 corresponding to the person in charge for step 1 is "supervisor 1", and the implementer of step 11 corresponding to the node C11 is "worker 11". The above three rows of comment trees are also static project plans subdivided in advance.

In the dynamic process of the project implementation after the plans are completed, for the working content represented by each node above, the communication may be performed by way of sharing through comment. Hence, each comment also represents a message. For example, the message of the node C111 indicates that the progress is reported to the "supervisor 1" at the weekend by the "worker 11". The message does not relate to the concrete working content, but it is obvious that the message refers to the working step 11 in the previous-level comment node C11. This message is not only visible to all people, but also specifically shared to the "supervisor 1" to remind that the previous-level working is delayed. Thus, the supervisor can know the progress of a week without convening a weekly meeting. Then, the following comment C101 of the comment of the node C1 is published, and is specifically shared to the previous level, that is, the "project manager" in the node C0, to report the working progress. On the one hand, this saves a lot of regular meeting time, and on the other hand, the "project manager" can keep track of the actual progress of each step of the project.

The comment of node C131 in the figure is the message specifically shared by the "worker 13" to the "supervisor 1" about the difficulties encountered in the work and the request for help. The ellipse in the comment represents specific difficulties. In the case that the "supervisor 1" has not responded or the method of reply is not good enough, other persons such as "project manager", "worker 11", etc., can reply to the comment to provide reference solutions.

The node C221 in the figure is a comment that the "supervisor 2" specifically shares with the "worker 22" to require the "worker 22" to pay attention to some matters at work, because the "supervisor 2" finds some problems of the "worker 22" in work.

In another embodiment, the method may also be used for operation management. For example, in FIG. 20, it is a comment tree for operation management of a company. The electronic content of the node D0 in the first row describes the company profile and system. The comment nodes D1, D2, D3 and D4 in the second row represent various departments of the company, respectively depicting the functions of the sales department, the finance department, the production department and the purchase department. The above two rows are static settings of the organizational structure of the company. In practical operation, for example, when the sales department signs a new contract or a new order, a new comment D31 is initiated to the node D3 corresponding to the production department of the main department that completes the order, to inform that 10,000 new orders are received, and the comment is specifically shared to the production department and the purchase department of the auxiliary department that completes the order. After the purchase of the purchase department is completed, the comment on the described node D31 is reinitiated, indicating that the purchase of the spare parts is completed, and the comment is specially shared to the production part, so that it can confirm the start of production.

When the sales department needs to reimburse the business trip expenses of last month, the sales department can publish the following comment D11 of the node D1 of the department, and apply for reimbursement including the expense detail form to the finance department as the specific sharing object. After a preliminary examination, the finance department can send a following comment D11 of consent to the comment D111 and specially share the comment to the sales department and the general manager, and finally, the general manager publishes a following comment D1111 to consent to the reimbursement. After the finance department receives this message, the payment system in the electronic content can also directly place the money to the sales department, and display the payment result through the node D11111.

In the above two embodiments related to management, the work items are taken as the comments, wherein the work items are all things and organizations related to work, such as work steps, flows, responsibilities, etc., and may further include files related to work, tables, information communication in work, etc. The person in charge of the work items is the department or person who leads, is responsible for, implements, completes and participates in the work matter, generally as the publisher of the electronic content or comments. Through a comment system with specific sharing, as an implementation tool for management, the following advantages are provided.

Firstly, the management system has a plurality of work items and persons in charge. In the real world, there is a transverse connection between them in addition to a contact represented by a tree structure. However, the existing comment system, that is, the comment system without specific sharing, is only a tree structure, and has a large difference from the reality. However, the comment system with specific sharing of the present disclosure adds a transverse connection through specific sharing on an original tree structure, that is, when a comment of each node is generated, the comment is related to a previous-level node, and can establish a connection with any user in the system through specific sharing, thereby better simulating the real world.

Secondly, it is efficient and convenient to communicate through the method of the present disclosure in the work. In a case where a specific sharing receiving user is specified and an explicit target exists in the communication, it is convenient to communicate by following comments, and it can be very concise to publish messages through comments. For example, in FIG. 20, if the general manager receives the comment D111 of specific sharing by the finance department, the general manager can go back to the application of the sales department of D11 to understand the context of the matter by checking the comment chain of the comments. The interface seen by the general manager in the client is shown as 2200 in FIG. 22. The areas D0, D1, D11 and D111 respectively correspond to the same node in FIG. 20, and jointly form a comment chain taking the comment of the area D111 as the starting point. The item D111-2 indicates that the comment of the comment area D111 where the item D111-2 is located is specially shared by the finance department to the general manager. Since the cause of the event can be traced back by the comment chain, it can also be brief and apparent when the information is exchanged, which clearly indicates the flow direction of the information. For example, the comment D111 initiated by the finance department in the figure is merely simple "consent reimbursement", but the specific details of the consent reimbursement can be found in the previous-level comment area D11.

Finally, information communication between persons, finances and objects in the work is performed through comments, and details and processes in the work are realistically recorded, and in addition to specific sharing, this information communication can also be simultaneously disclosed to other users, such as project manager or general manager. Hence, these real and disclosed records can be used to assess employee abilities and attitudes, measure progress, improve work processes, and optimize the organization. These jobs can be manually counted, but a better method is to use cloud computing or even artificial intelligence. For example, if the working progress can be automatically statistically counted, the subordinate does not need to spend a lot of time to make PPT to superiors which may be exaggerated.

In conclusion, the above method can be used for more precise, more accurate and more efficient supervision and control of various management processes.

Figure 20:
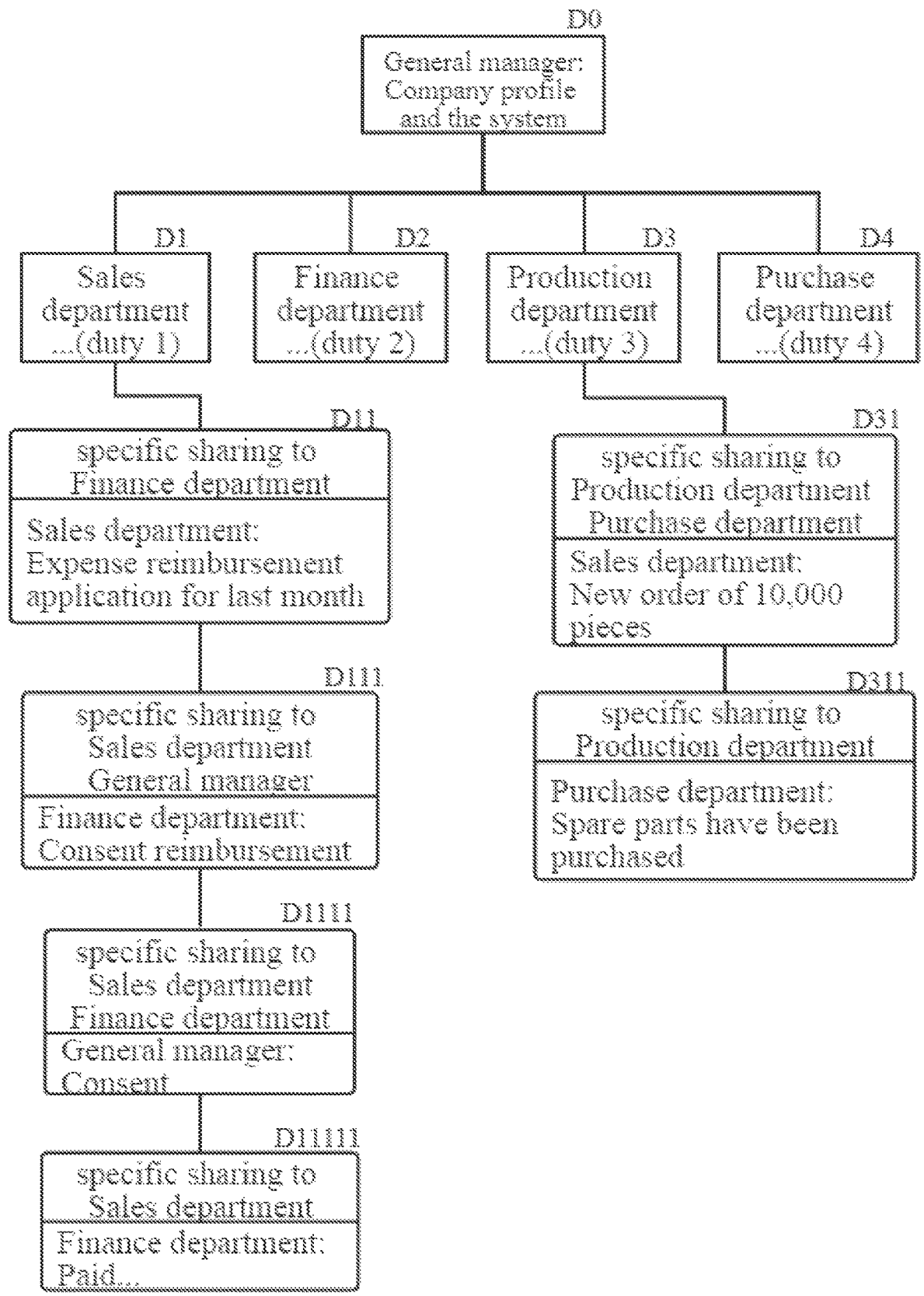
FIG. 20 is a tree graph of comment nodes applied to operation management according to an embodiment of the present disclosure.

In another embodiment, since the departments represented by D1-D4 in FIG. 20 are fixed, the departments can be individually displayed in the electronic content list as the electronic content.

In order to better apply to management, the following functions are added on the basis of the flow chart of the embodiment shown in FIG. 12. Of course, the functions of these embodiments are not limited to the management field, but can also be applied to other scenarios where necessary.

In one embodiment, a comment publisher may be set. For example, the comments of the first row to the third row in FIG. 19 or the first row and the second row in FIG. 20 belong to a preset static part, and can be published by a management user such as a project manager or general manager. However, if the publisher of the comment displayed on the interface is displayed in the described figure, it may clearly indicate the person in charge of the step or responsibility in the comment. In addition, when a following comment is published, the specific sharing object can be the publisher of the previous-level comment by default in order to improve the communication efficiency. Hence, the function of setting the comment publisher needs to be added. The setting method is that, for example, in step S101 of FIG. 12, a step of receiving other usernames as publishers of the comment is included; furthermore, in step S102, when the sharing data is formed, the User1 is not set as the comment publisher, but other users received in the previous step S101 are set as the comment publishers.

Figure 21:
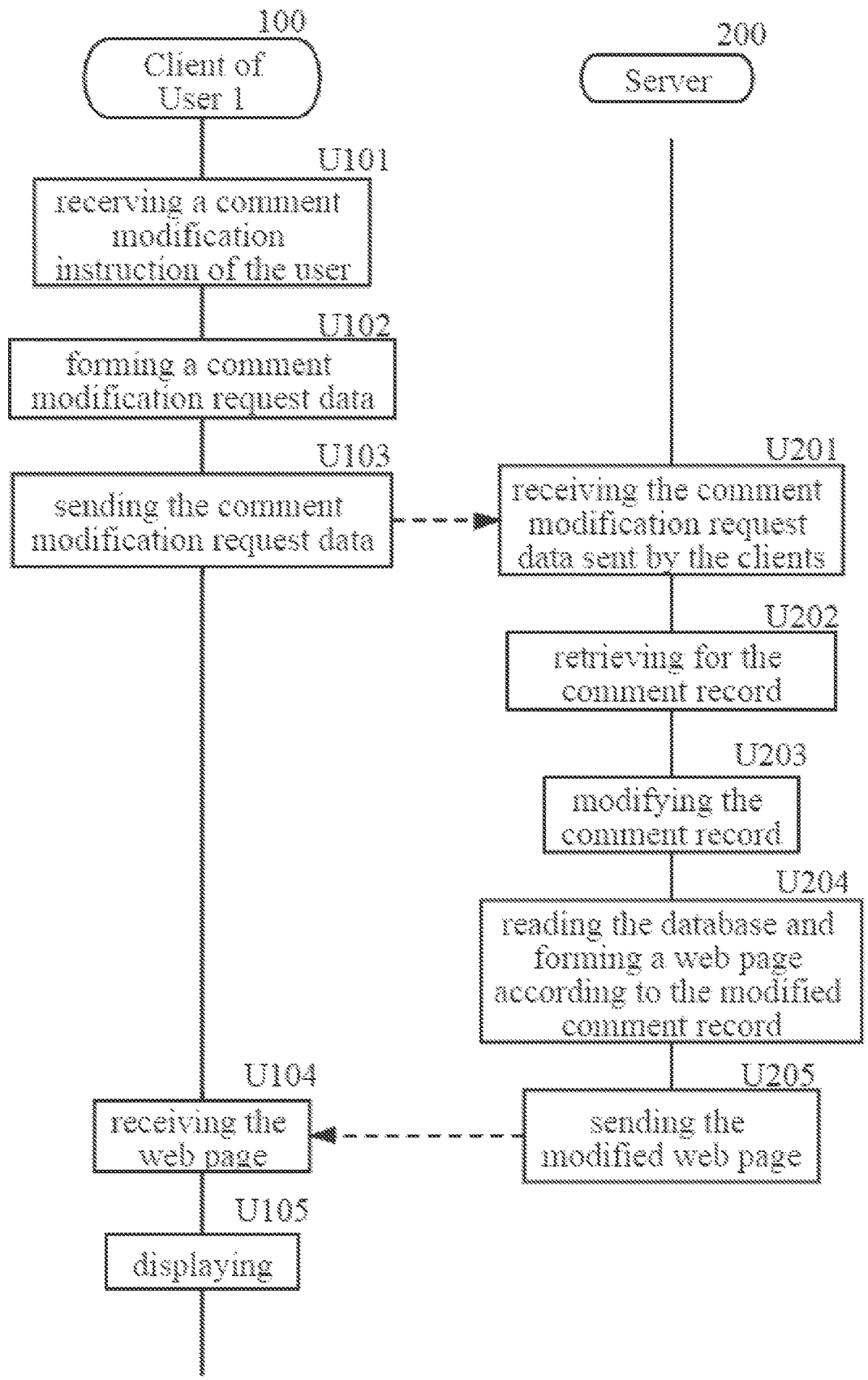
FIG. 21 is a flowchart of modifying comments according to an embodiment of the present disclosure.

In another embodiment, the modification of the comments is included. For example, if the project steps or implementers of plans in first to third rows in FIG. 19 are changed, the contents or publishers of the comments may need to be modified. The implementation includes: in FIG. 21, a client 100 of the User1 receives a comment modification instruction initiated by the User1 through a human-computer interaction interface (U101), and forms comment modification request data (U102), wherein the comment modification request data includes the electronic content ID, the comment ID and the comment modification, and includes the publisher or content of the comment. Then, the comment modification request data is sent to the server 200 (U103). After receiving the comment modification request data (U201), the server 200 retrieves a corresponding comment record in the comment table according to the electronic content ID and the comment ID of the comment (U202), and modifies the corresponding data item in the comment record according to the modification requirements in the comment modification request data, such as the publisher or the content of the comment (U203). Then, the data related to the electronic content in the database is read, and a web page is formed according to the modified comment record (U204), and sent to the client (U205). After receiving the web page data (U104), the client displays it (U105).

In another embodiment, management of comment reading permissions is also included. After all the activities in the project implementation or company operation are recorded in a manner of comments, it is impossible for all people to view all the information due to the management, so the permission management is necessary, so that some people cannot see the comments irrelevant to the information. The implementation method is as follows.

Firstly, in the user table in the database, a data item of "user permission" is added to each record. When a user is registered, the own permission feature of the user is indicated according to user hierarchy or department setting. Meanwhile, in the electronic content table and the comment table, a data item of "reading permission" is added to each record. When the "user permission" of a common user, that is, a user other than a specific sharing receiving user, matches the "reading permission", the client can receive the electronic content or comments sent by the server and display the electronic content or comments. The two types of permission match may be, for example: a user client with a "user permission" of 3 can only display electronic content or comments with a "reading permission" of 3 or less. Alternatively, in FIG. 20, the client of the employee of the production department can only display the electronic content or comments whose "reading permission" includes the production department.

Secondly, in the embodiment of FIG. 12, in step S101 of receiving the user sharing instruction, the method further includes receiving the "reading permission" set by the user. Or in step S102 of forming the sharing data, the system automatically sets the "reading permission" according to the position of the publisher of the electronic content or comments, or the position of the receiving user of a specific sharing. For example, the reading permissions of the comment of the node D111 in FIG. 20 are merely the general manager, the finance department and the sales department.

Then, in step S203 of retrieving the data from the database, after completing retrieving the electronic content or comments with specific sharing, for other electronic content records or comment records without specific sharing, permission matching needs to be considered. Only the record with the matching permission can enter the next step S204. In this way, the permission management can be performed on the basis of the flow chart of FIG. 12 through the above adjustment.

In another embodiment of the permission management, the setting of the "user permission" in the user table adopts the role-based access control (RBAC). Namely, a role table is added in the database, wherein each record includes a "role ID" and a "role permission". The data item of "reading permission" is no longer added in the user table, but the data item of "role ID" is added. In this case, the role table is retrieved through the "role ID" in the user record, and the user permission s are finally determined by the found "role permission" in the role record. The advantage of this is that when a user changes the position, the permission of the user will automatically change.

In another embodiment, all of the specific sharing information is displayed. For example, in the interface 2200 in FIG. 22 seen by the foregoing general manager, not only specific sharing information is sent to the general manager, but also other specific sharing information is displayed, such as, "Shared To Finance Department" D11-1, which is shared specifically to the finance department, and "Shared To Sales Department and General Manager" D111-1, which is shared specifically to the sales department included. In this way, the flow direction of various comment messages can be displayed more clearly. The implementation method is that, in the flow chart of the embodiment of FIG. 12, in step S203 of reading from the database, all the sharing records related to the comments D11 or D111, rather than just a specific sharing record related to the receiving user, that is, the general manager, need to be read. Then, in step S204 of generating the web page in the figure, the specific sharing information in all the specific sharing records is displayed in a prominent manner, such as D11-1, D111-1, etc. in FIG. 22.

In another embodiment, an indirect comment may be initiated on the target electronic content or comments while being shared through comment. For example, in the embodiment interface 2200 shown in FIG. 22, a mark shown by 2201 is provided in the upper part of all the comment areas, the mark 2201 for the electronic content is provided at the bottom of the interface, and a window 2250 is popped up after the mark 2201 is clicked. Firstly, the 2251 is clicked, and a selection interface of the specific sharing receiving user similar to that shown in FIG. 6 may appear. The current user selects the receiving user, then returns to the 2250 interface and clicks the items in the area 2252, such as "voice message", "video message", "voice call", "video call", "photo", "chatting", "payment" and "table". The corresponding interfaces will be generated, such as the recording and video interfaces commonly used in smart phones now, the voice call, video call, photo, chatting and payment interfaces of WeChat, as well as the interface for table selection and editing. The user may perform corresponding operation on the interfaces. Except the table selection and editing interfaces, they all belong to the prior art, wherein an object of operations of voice call, video call, chatting and payment is the receiving user selected by clicking item 2251 described above. After the operation on the interface is finished, result data may be generated, for example, "voice message", "video message", "voice call" and "video call" may generate audio and video files, "photo" may generate picture files, "chatting" may generate instant messaging data, "payment" may generate result data of payment return, and "table" may generate table data. The client takes the result data as the content of a new comment. The new comment may also be specifically shared to the receiving user selected by clicking item 2251. This is equivalent to that in step S101 in which the client in FIG. 12 receives the sharing instruction of the user, the sharing content is not directly input by the user through, for example, the input box 721 in the interface of FIG. 7, but the sharing content data is indirectly formed by the described operation of the user. The new comments may use URLs to locate audio files, video files, etc., and may be replayed after clicking.

Figure 22:
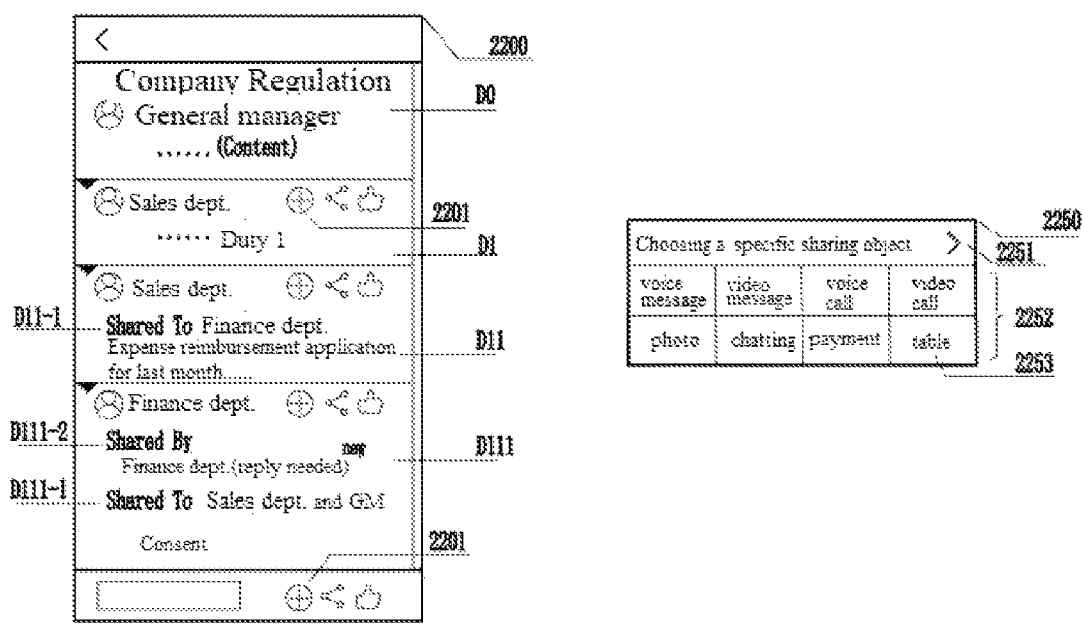
FIG. 22 is an interface diagram of initiating indirect sharing operation on an existing comment according to an embodiment of the present disclosure.
Figure 23:
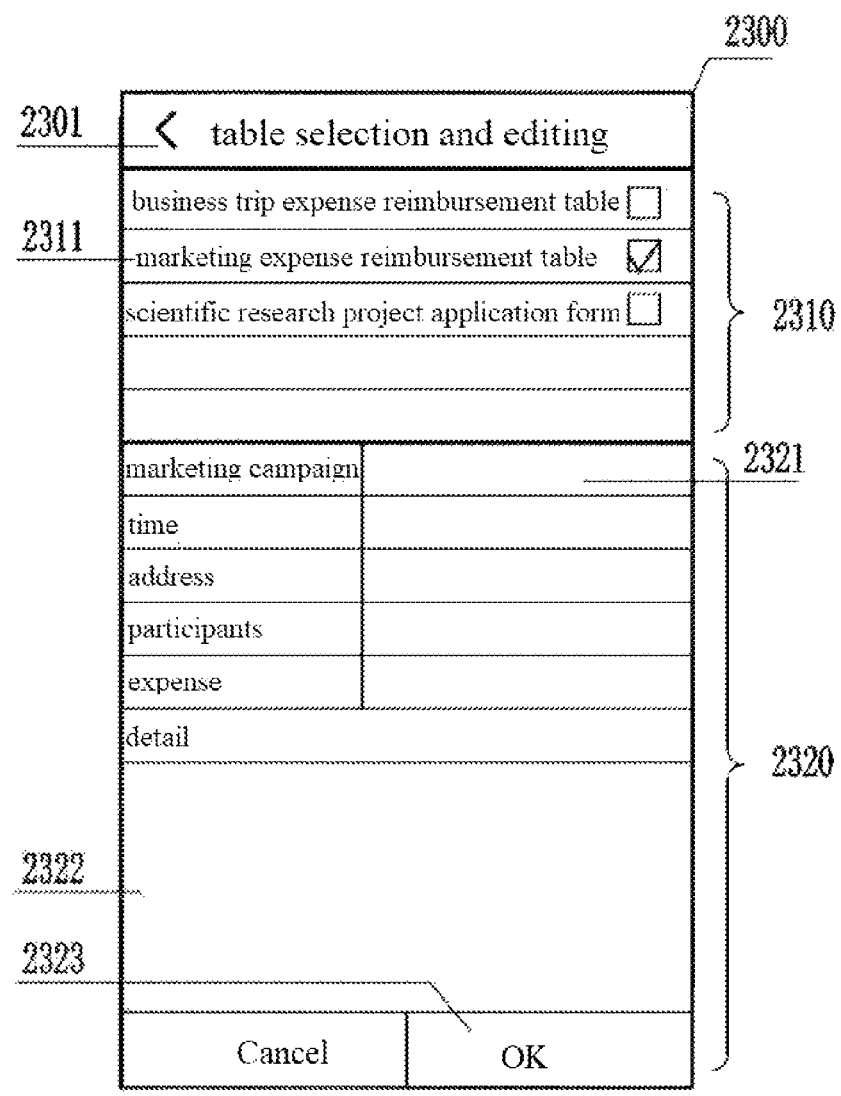
FIG. 23 is an interface diagram of table selection and editing according to an embodiment of the present disclosure.

The "table" 2253 is included in the area 2252 in FIG. 22. After the "table" is clicked, a table selection and editing interface 2300 as shown in FIG. 23 is generated. The upper area 2310 displays the table list that various organizations, such as enterprises, can set according to its own characteristic. After the table "marketing expense reimbursement table" shown by item 2311 is selected, a specific format of the table appears in the lower area 2320, and the user can fill the table according to the requirements thereof. For example, a marketing campaign name is filled in the input box 2321, and fine cost is filled in the larger input box 2322. After the filling is completed, the following "OK" button 2323 is pressed, and the selection and filling of the table are completed. Then, as described above about voice messages and the like, a new comment with table data as content may be generated.

In another embodiment of commenting through an indirect operation, the sharing initiating data is not formed at the client as described above, but after the client sends the related data to the server, the related data is combined at the server side to generate the sharing initiating data of a new comment. The sharing initiating data is sent to step S202 shown in FIG. 12 and the following process is performed, and finally the web page with the new comment is sent to the client and displayed.

Through the specific sharing through the indirect comments, the means for communicating by publishing the comments are more varied and richer, and the user may use a suitable manner, such as a voice message, to make the communication more convenient.

In another embodiment, the sharing that needs to be replied is added. The comment of the area D111 in interface 2200 of FIG. 22, such as, D111-1, is noted that it is specifically shared by the finance department to the general manager and the sales department. However, these two kinds of the specific sharing are different: the sharing to the general manager is to wait for the reply of the consent or refusal about the reimbursement, while the sharing to the sales department is only to inform the progress of the reimbursement matters. Hence, in addition to the original specific sharing to notify only, there is a need for a new specific sharing that needs to be replied. The specific implementation is as follows.

Firstly, the sharing record in the sharing table in the database also needs to be added with the "receiving user ID of the sharing that needs to be replied".

Figure 24:
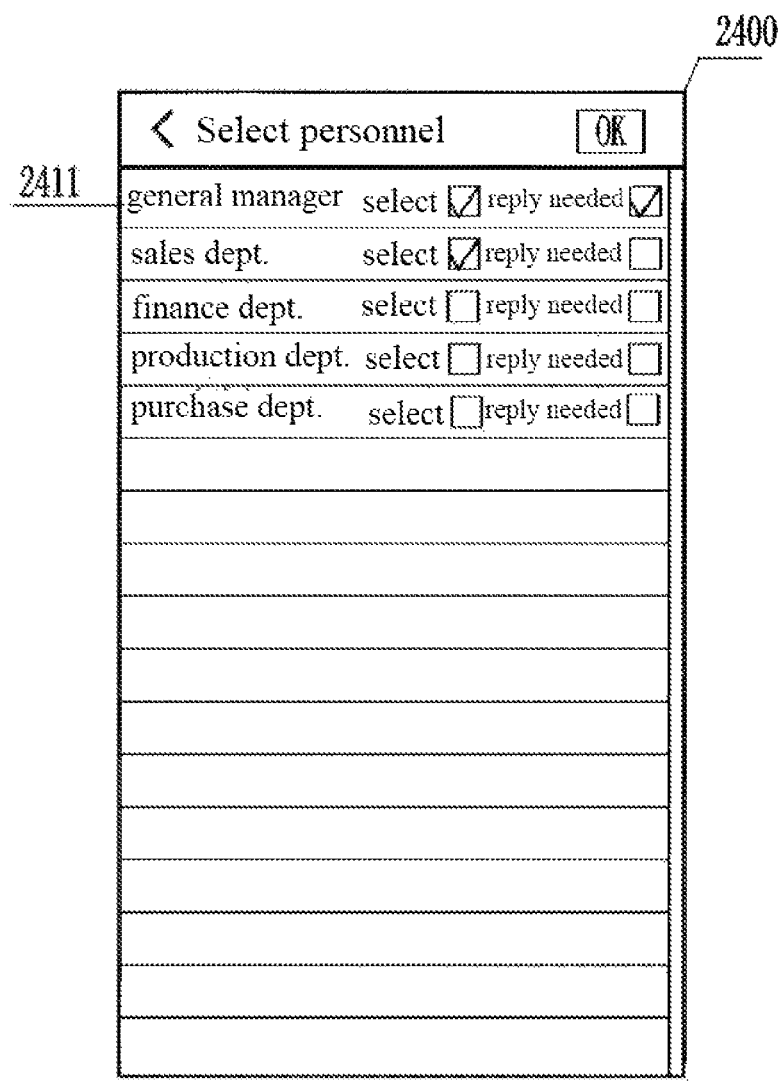
FIG. 24 is an interface diagram of selecting a receiving user that needs reply according to an embodiment of the present disclosure.

In the flow chart of the embodiment of FIG. 12, in step S101 of receiving the sharing operation instruction of the user, when the receiving user is determined, it is also necessary to determine whether the receiving user needs to reply. For example, the finance department selects the general manager and the sales department as the receiving users of the specific sharing through the interface 2400 in FIG. 24, and also selects an option of "reply needed" in 2411, indicating that the general manager needs to reply as soon as possible. In FIG. 12, in the step of forming the sharing initiating data, a receiving user that needs to reply is further included, such as, the general manager. In step S205 of generating the web page by the server, when it is detected that the receiving user ID is equal to the "receiving user ID of the sharing that needs to be replied" in the sharing record read in step S203, an annotation that needs to be replied needs to be added. In this way, the web page data is sent to the client, such as, the client of the general manager, and displayed as shown in FIG. 22. The annotation that needs to be replied is shown as "Shared By Finance department (reply needed)" D111-2 in the figure, wherein the "reply needed" in parentheses prompts the general manager to reply to this comment as soon as possible. The general manager clicks the "reply needed" and replies the comment on a popped interface similar to the interface shown in FIG. 7. In addition, the comments which need to be replied but have not been replied are arranged in front of all other comments, or there are unread marks such as the "new" on item D111-2 in FIG. 22. In this way, the receiving user can be reminded in a more prominent way to reply as soon as possible.

Another embodiment also includes that the receiving user actively confirms whether the specific sharing messages have been read. For example, the messages of the nodes D31 and D311 in FIG. 20 all need to be confirmed by the production department whether they have been read, so that the general manager knows that the production department has made preparations for the next work. A method that the production department gives a like to the messages can be adopted to indicate that the production department has read the messages.

In addition, the present disclosure also relates to a computing device including a processor and storing a computer program. When the program is loaded and executed by the processor such as CPU, the program can be used for implementing the method applied to the client. Or, after the program is downloaded and installed to the client through the network, when the program is loaded and executed by the processor of the client, such as CPU, the program can be used for implementing the method applied to the client.

In addition, the present disclosure also relates to another computing device including a processor and storing a computer program, which stores programs with instructions. When the program is loaded and executed by the processor such as CPU, the program can be used for implementing the method applied to the sever.

Obviously, the embodiments described in the present disclosure are merely a part of the embodiments of the present disclosure, and not all of the embodiments. Based on the embodiments of the present disclosure, all other implementations obtained by those ordinary skilled in the art without creative efforts belong to the scope of protection of the present disclosure.

The invention claimed is:

1. A method for sharing electronic content or comment to specific user, in which a processor is applied to execute instructions to perform, applied to a client, comprising:
   receiving a sharing operation instruction of a first user for electronic content or comment at a client of the first user;
   forming a sharing initiating data related to the sharing operation at the client of the first user;
   sending the sharing initiating data to a server at the client of the first user;
   receiving a sharing receiving data related to the sharing operation sent by the server at client of specific user;
   displaying the electronic content or comment directly, and simultaneously displaying a sharing information of the first user in a prominent manner in a display page or window for the electronic content or comment at the client of the specific user;
   wherein the sharing information of the first user displayed in a prominent manner is an additional information; the additional information indicates that the electronic content or comment is shared by the first user to the specific user; and
   the specific user is receiving user determined in the sharing operation of the first user for the electronic content or the comment, or is receiving user determined by the first user in advance.

2. The method according to claim 1, wherein a manner of the sharing operation is one of the following: direct sharing, sharing through attitude or sharing through comment.

3. The method according to claim 1, wherein displaying the sharing information of the first user in a prominent manner comprises one or more of the following:
   displaying an identifier of the first user in a display area of the electronic content or comment;
   displaying the manner of the sharing operation in the display area of the electronic content or comment;
   highlighting the identifier of the first user at a publisher position of the comment when a shared object is the comment published by the first user;
   displaying the electronic content or electronic content to which the comment belong in a front position in an electronic content list;
   displaying the comment in a front position in a comment area when the shared object is the comment published by the first user;
   displaying the first user in a front position in a display interface of the sharing initiator; and
   displaying a number of the sharing when the sharing is a direct sharing or a sharing through attitude.

4. The method according to claim 1, wherein when the sharing is a sharing through comment, the method further comprises accepting a setting of whether the first user discloses new comment in the sharing, and when the setting of whether the first user discloses the sharing is no, the new comment in the sharing is only displayed on the client of the specific user.

5. The method according to claim 1, wherein the specific user can further set allowed sharing initiating user or rejected sharing initiating user, and when the first user is the allowed sharing initiating user, or when the first user is not the rejected sharing initiating user, the sharing information of the first user are displayed in a prominent manner on the client of the specific user.

6. The method according to claim 1, wherein displaying the sharing information of the first user in a prominent manner further comprises displaying an unread mark on the unread sharing information.

7. The method according to claim 1, further comprising:
   receiving an instruction of a user to display a comment chain, and sending to the server; and
   receiving a data about the comment chain returned by the server, and displaying the data.

8. The method according to claim 1, wherein the sharing operation instruction of the first user for electronic content or comment further comprises: setting a publisher of the comment and displaying the publisher on a publisher position of the comment.

9. The method according to claim 1, further comprising:
   receiving modifications of the first user to existing comment;
   returning the modifications to the server; and
   receiving the modified data of the comment returned by the server, and displaying the modified data.

10. The method according to claim 1, further comprising:
    receiving a setting of an reading permission of the electronic content or the comment by the first user, or automatically setting an reading permission of the electronic content or the comment by a system;
    wherein the reading permission is that, for other user other than the specific user, only when its own right feature matches the reading permission of the electronic content or comment, the client of the other user thereof can receive the data of the electronic content or comment sent by the server and display the data.

11. The method according to claim 1, wherein when the sharing is a sharing through comment, the method further comprises:
the sharing operation of the electronic content or comment by the first user is an indirect sharing operation; the indirect sharing operation is any one of the following:
operations of the first user on voice messages, video messages, voice calls, video calls, photographing, chatting, payment, and publishing tables for electronic content or comment.

12. The method according to claim 1, wherein the specific user further comprise specific user that needs to reply, and the step of displaying the sharing information of the first user in a prominent manner at the client of the specific user further comprises:
displaying an annotation that the sharing needs to be replied.

13. A computing device, comprising a processor and a readable storage medium storing a computer program, wherein the computer program is used for implementing the method according to claim 1 when loaded and executed by the processor; the processor for loading and executing is a processor of the computing device or a processor of an other computing device; and the other computing device downloads the computer program from the computing device through a network.

14. A method for sharing electronic content or comment to specific user, in which a processor is applied to execute instructions to perform, applied to a server, comprising:
receiving sharing initiating data of the electronic content or comment thereof sent by the client of the first user;
forming sharing receiving data according to the sharing initiating data;
sending the sharing receiving data to a client of a specific user;
wherein the electronic content or comment is displayed directly, and a sharing information is simultaneously displayed in a prominent manner in a display page or window for the electronic content or comment after the client of the specific user receive the sharing receiving data; the sharing information of the first user displayed in a prominent manner is an additional information; and the additional information indicates the electronic content or comment are shared by the first user to the specific user.

15. The method according to claim 14, wherein forming sharing receiving data according to the sharing initiating data further comprises: forming a web page data displaying the sharing information of the first user in a prominent manner.

16. The method according to claim 14, wherein displaying the sharing information in a prominent manner comprises one or more of the following:
displaying an identifier of the first user in the display area of the electronic content or comment;
displaying the manner of the sharing operation in the display area of the electronic content or comment;
highlighting the identifier of the first user at the publisher position of the comment when a shared object is the comment published by the first user;
displaying the electronic content or electronic content to which the comment belong in a front position in the electronic content list;
displaying the comment in a front position in the comment area when the shared object is the comment published by the first user;
displaying the first user in a front position in the display interface of the sharing initiator; and
displaying the number of the sharing when the sharing is a direct sharing or a sharing through attitude.

17. The method according to claim 14, further comprising:
sending the comment only to the specific user when the sharing is a sharing through comment and new comment in the sharing contain undisclosed flags.

18. The method according to claim 14, further comprising:
adding a sharing unread mark on the web page when it is detected that the sharing information is not read by the specific user.

19. The method according to claim 14, further comprising:
receiving comment modification requests from the client of the first user;
modifying a database related to the comment according to the modification requests; and
returning a modification result to the client.

20. The method according to claim 14, wherein when it is detected that the sharing needs to be replied, displaying the sharing information in a prominent manner further comprises: displaying the annotation that the sharing needs to be replied.

* * * * *